(12) United States Patent
Abe

(10) Patent No.: US 12,248,127 B2
(45) Date of Patent: Mar. 11, 2025

(54) ZOOM LENS AND IMAGE DEVICE

(71) Applicant: TAMRON CO., LTD., Saitama (JP)

(72) Inventor: Shingo Abe, Saitama (JP)

(73) Assignee: TAMRON CO., LTD., Saitama (JP)

( * ) Notice: Subject to any disclaimer, the term of this patent is extended or adjusted under 35 U.S.C. 154(b) by 567 days.

(21) Appl. No.: 17/513,287

(22) Filed: Oct. 28, 2021

(65) Prior Publication Data

US 2022/0276474 A1   Sep. 1, 2022

(30) Foreign Application Priority Data

Feb. 26, 2021 (JP) .................... 2021-030318

(51) Int. Cl.
*G02B 15/14* (2006.01)
*G02B 3/04* (2006.01)
*G02B 13/00* (2006.01)

(52) U.S. Cl.
CPC ........... *G02B 15/1465* (2019.08); *G02B 3/04* (2013.01); *G02B 13/0045* (2013.01)

(58) Field of Classification Search
CPC ... G02B 15/1465; G02B 3/04; G02B 13/0045
USPC ....................................................... 359/676
See application file for complete search history.

(56) References Cited

U.S. PATENT DOCUMENTS

| 7,773,311 B2 | 8/2010 | Endo | |
|---|---|---|---|
| 8,958,007 B2 | 2/2015 | Nishimura | |
| 8,982,476 B2 | 3/2015 | Maetaki | |
| 2013/0258130 A1* | 10/2013 | Mihara | G02B 15/17 348/222.1 |
| 2013/0286257 A1* | 10/2013 | Tashiro | G02B 9/60 359/557 |
| 2018/0074300 A1* | 3/2018 | Gyoda | G02B 15/177 |

FOREIGN PATENT DOCUMENTS

| JP | 2009-169051 A | 7/2009 |
|---|---|---|
| JP | 2014-021258 A | 2/2014 |
| JP | 2014-026211 A | 2/2014 |

* cited by examiner

*Primary Examiner* — Sharrief I Broome
(74) *Attorney, Agent, or Firm* — Paratus Law Group, PLLC

(57) ABSTRACT

A zoom lens includes: a first lens group having negative refractive power on a most object side; and a positive lens group Pa having positive refractive power, a negative lens group N having negative refractive power, and a positive lens group Pb having positive refractive power that are arranged in this order from the object side and provided on an image side with respect to the first lens group.

7 Claims, 24 Drawing Sheets

ZOOM LENS AND IMAGE DEVICE

CROSS-REFERENCE TO RELATED APPLICATIONS

This application is based on and claims the benefit of priority from Japanese Patent Application No. 2021-030318, filed on Feb. 26, 2021, the entire contents of which are incorporated herein by reference.

BACKGROUND OF THE INVENTION

Technical Field

The present invention relates to a zoom lens and an image device, and more particularly to a zoom lens suitable for a small image device using a solid-state image sensor or the like, and an image device.

Related Art

Image devices using solid-state image sensors such as digital still cameras and digital video cameras have been widely used. As an optical system of an image device, for example, a wide angle or standard zoom lens that includes a first lens group having negative refractive power, a second lens group having positive refractive power, a third lens group having negative refractive power, and a fourth lens group having positive refractive power in order from an object side is known (see, for example, JP 2014-21258 A, JP 2014-26211 A, and JP 2009-169051 A). By adopting such an optical configuration, various aberrations can be favorably corrected, and the entire configuration can be made compact.

In the zoom lens described above, the second lens group and the fourth lens group are moved with the identical locus during zooming. Therefore, in these zoom lenses, these two positive lens groups can be configured as one unit. By unitizing both lens groups, it is possible to suppress an eccentricity error or the like at the time of assembly from occurring, possible to reduce a manufacturing error, and possible to improve a yield.

By the way, a zoom lens is likely to be a dark lens because the number of lenses constituting the zoom lens is larger than that of a single focal lens. When the two positive lens groups are configured as one unit during zooming, it is advantageous in reducing the eccentricity error and the manufacturing error as described above, but there is a restriction in achieving a large aperture and a small size while maintaining high optical performance. For example, the zoom lenses disclosed in JP 2014-21258 A and JP 2014-26211 A have the Fno at the telephoto end that is about 5.8, and the aperture is not large. On the other hand, the zoom lens disclosed in JP 2009-169051 A has the Fno of 2.8, and the aperture is large. However, in the zoom lens, a plurality of lens groups are moved at the time of focusing, and a movement mechanism of the lens groups at the time of focusing and during zooming becomes complicated. Therefore, the zoom lens is not sufficiently downsized.

An object of the present invention is to provide a wide angle or standard zoom lens that has a large aperture, a small size, and a high optical performance, and an image device.

SUMMARY OF THE INVENTION

In order to solve the above problem, a zoom lens according to the present invention includes: a first lens group having negative refractive power on a most object side; and a positive lens group Pa having positive refractive power, a negative lens group N having negative refractive power, and a positive lens group Pb having positive refractive power that are arranged in this order from an object side and provided on an image side with respect to the first lens group, wherein during zooming from a wide angle end to a telephoto end, the first lens group moves to an image side, the positive lens group Pa and the positive lens group Pb move to an object side along an identical locus, and magnification is varied by changing an interval on an optical axis between adjacent lens groups, the negative lens group N is moved to an image side to focus on an object at a finite distance from infinity, and following conditions are satisfied:

$$0.80 < (Rnf+Rnr)/(Rnf-Rnr) < 1.40 \quad (1)$$

$$-1.20 < fn/ft < -0.50 \quad (2)$$

where
Rnf is a curvature radius of a surface of a most object side in the negative lens group N,
Rnr is a curvature radius of a surface of a most image side in the negative lens group N,
fn is a focal length of the negative lens group N, and
ft is a focal length of the zoom lens at a telephoto end.

In order to solve the above problem, an image device according to the present invention includes the zoom lens and an image sensor that converts an optical image formed by the zoom lens into an electrical signal.

DESCRIPTION OF THE EMBODIMENTS

Figure 1:
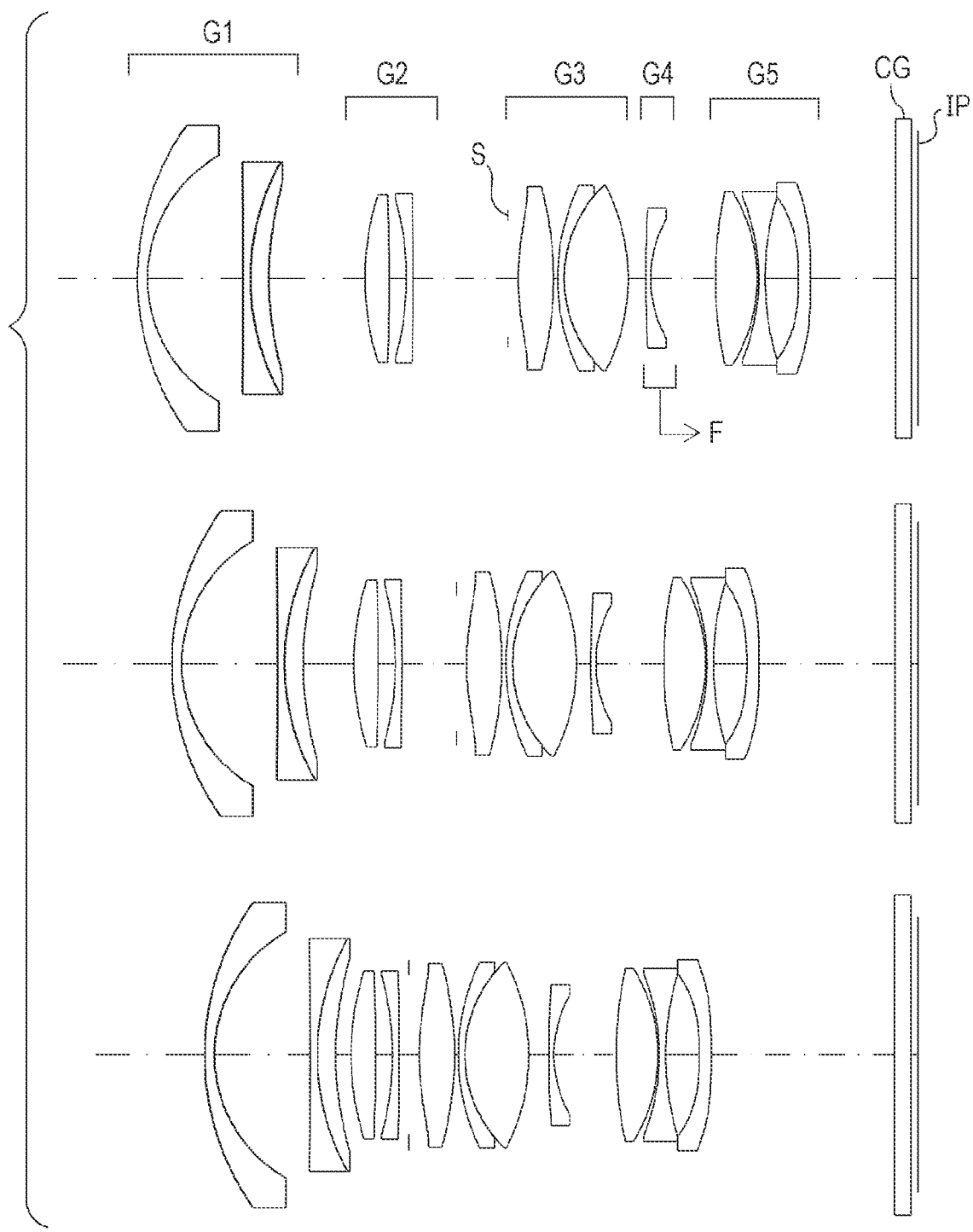
FIG. 1 is a lens cross-sectional view of a zoom lens according to a first embodiment at the time of infinity focus; However, the upper stage indicates a wide angle end, the middle stage indicates an intermediate focal length, and the lower stage indicates a telephoto end (the same applies hereinafter)

Embodiments of a zoom lens and an image device according to the present invention will be described below. However, the zoom lens and the image device described below are one aspect of the zoom lens and the image device according to the present invention, and the zoom lens and the image device according to the present invention are not limited to the following aspects.

1. Zoom Lens 1-1. Optical Configuration

A zoom lens according to the present embodiment includes: a first lens group having negative refractive power on a most object side; and a positive lens group Pa having positive refractive power, a negative lens group N having negative refractive power, and a positive lens group Pb having positive refractive power that are arranged in this order from an object side and provided on an image side with respect to the first lens group.

The zoom lens can facilitate aberration correction during zooming while widening the angle of view at the wide angle end by employing the refractive power arrangement. Therefore, it is possible to achieve a wide angle or standard zoom lens that has a small size and a high optical performance.

Here, the zoom lens is only required to include the first lens group, and the positive lens group Pa, the negative lens group N, and the positive lens group Pb, which are adjacently arranged in order from the object side on the image side from the first lens group. The zoom lens may be substantially composed of the four lens groups, or may include other lens groups. For example, various configurations can be adopted, such as a four-group configuration having a refractive power arrangement of negative, positive, negative, and positive in order from the object side, a five-group configuration having a refractive power arrangement of negative, negative, positive, negative, and positive or a refractive power arrangement of negative, positive, positive, negative, and positive in order from the object side, and a six-group configuration having a refractive power arrangement of negative, negative, positive, positive, negative, positive, and a refractive power arrangement of negative, positive, positive, negative, positive, and positive in order from the object side. In any configuration, by changing the interval on the optical axis between adjacent lens groups during zooming, aberration correction is facilitated, and it is possible to achieve a zoom lens having a high optical performance in the entire magnification range. However, from the viewpoint of downsizing the zoom lens, the number of lens groups substantially constituting the zoom lens is preferably 6 or less.

(1) First Lens Group

The first lens group is a lens group arranged on the most object side in the zoom lens, and moves to the image side during zooming from the wide angle end to the telephoto end. In a so-called negative-preceding type zoom lens in which a lens group having negative refractive power is arranged on the most object side, the close photographing distance can be shortened, and the wide angle of view is relatively easily obtained. In such a negative-preceding type refractive power arrangement, it is relatively easy to secure back focus, and thus it is suitable as an optical system for a single lens reflex camera. On the other hand, in an optical system for an image device not necessary to have a reflex mirror such as a mirrorless camera, back focus may be shorter than that of an optical system for a single lens reflex camera. In the optical system of the image device in which the back focus may be short, a lens configuration close to a symmetric shape can be adopted even in a case where the negative-preceding type refractive power arrangement is adopted. If the aperture is increased in the asymmetric lens configuration, excellent correction of various aberrations such as distortion aberration requires a complicated lens design, and there has been sometimes difficult to increase the aperture while maintaining small size and excellent imaging performance. On the other hand, in the lens configuration close to the symmetric shape, it is relatively easy to correct distortion aberration and the like even when the aperture is increased. Therefore, by using the zoom lens as an optical system such as a mirrorless camera, it becomes easy to achieve a large aperture while maintaining a small size and excellent imaging performance.

A specific lens configuration of the first lens group is not particularly limited as long as the first lens group has negative refractive power. In the wide angle or standard zoom lens including the first lens group having negative refractive power on the most object side, the ray height of the maximum off-axis pencil of light entering the first lens group, i.e., the entrance position of the maximum off-axis pencil of light with respect to the first lens group becomes high, and hence the off-axis ray enters the peripheral portion of the lens. Therefore, in order to achieve a wider angle of view at the wide angle end in a state where the zoom lens is maintained small, it is preferable to use a plurality of lenses having negative refractive power. It is preferable that in particular, at least one lens, preferably two or more lenses among the lenses having negative refractive power constituting the first lens group are meniscus lenses having a concave shape on the image side. By adopting such a configuration, it is possible to prevent the off-axis ray from being strongly bent when passing through each surface constituting the first lens group while arranging strong negative refractive power in the first lens group. Therefore, the occurrence of image plane curvature, distortion aberration, and the like can be reduced, and a zoom lens having excellent image plane characteristics can be obtained. In addition, in order to improve the image plane characteristics, it is preferable that at least one of the lenses in the first lens group has one or more aspheres.

Furthermore, in order to favorably correct various aberrations such as spherical aberration and coma aberration, the first lens group preferably includes at least one lens having positive refractive power.

Note that an optical element that does not have refractive power or has extremely small refractive power may be arranged on the object side with respect to the first lens group. Examples of such an optical element include various filters such as a protective filter for protecting the lens from dirt, scratches, and the like, an ND filter used for reducing the incident light amount, and a PL filter for adjusting the color.

(2) Positive Lens Group Pa and Positive Lens Group Pb

Each of the positive lens group Pa and the positive lens group Pb has positive refractive power. Furthermore, the positive lens group Pa and the positive lens group Pb move toward the object side with the identical locus during zooming from the wide angle end to the telephoto end. By moving the positive lens group Pa and the positive lens group Pb having positive refractive power with the same locus, the positive lens group Pa and the positive lens group Pb can be configured as one unit. Therefore, as compared with a case where the positive lens group Pa and the positive lens group Pb are moved with separate loci, a magnification mechanism for moving each lens group during zooming can be simply configured. Furthermore, it is possible to suppress an eccentric error or the like from occurring at the time of assembly, possible to reduce a manufacturing error, and possible to improve a yield.

A specific lens configuration of the positive lens group Pa and the positive lens group Pb is not particularly limited as long as the positive lens group Pa and the positive lens group Pb each have positive refractive power. The positive lens group Pb is arranged on the image side of the zoom lens. The ray height of the maximum off-axis pencil of light entering the positive lens group Pb varies with the magnification operation of the zoom lens. That is, the ray height of the maximum off-axis pencil of light entering the positive lens group Pb is different between the wide angle end and the telephoto end. Therefore, in order to favorably correct coma aberration and image plane curvature, and the like, the positive lens group Pb preferably includes at least one asphere.

(3) Negative Lens Group N

A specific lens configuration of the negative lens group N is not particularly limited as long as the negative lens group N has negative refractive power and is arranged adjacently between the positive lens group Pa and the positive lens group Pb, and the interval on the optical axis between the positive lens group Pa and the negative lens group N and the interval on the optical axis between the negative lens group N and the positive lens group Pb change during zooming. For example, the negative lens group N is preferably composed of one lens element. Here, the lens element refers to one single lens, a cemented lens in which a plurality of single lenses are integrated without an air interval, or the like. That is, one lens element refers to one in which only the surface of the most object side and the surface of the most image side are in contact with air, and the other surfaces are not in contact with air even in a case where the one lens element has a plurality of optical surfaces. In this description, the single lens may be either a spherical lens or an aspherical lens. In addition, the aspherical lens includes a so-called compound aspherical lens in which an aspherical film is attached to the surface.

By configuring the negative lens group N with one lens element, it is possible to reduce various manufacturing errors such as an eccentricity error and an error in an air interval between a plurality of lens elements. Therefore, it is possible to reduce deterioration in optical performance due to a manufacturing error, and it is possible to reduce a variation in performance for each product. Therefore, a zoom lens having high optical performance can be manufactured with high yield.

During zooming, by changing the interval on the optical axis between the negative lens group N and the positive lens group Pa and the interval on the optical axis between the negative lens group N and the positive lens group Pb, it is possible to favorably correct various aberrations in the entire zoom region, and a zoom lens having a large magnification ratio an be achieved. Furthermore, by changing the interval on the optical axis between the negative lens group N and the positive lens group Pa and the interval on the optical axis between the negative lens group N and the positive lens group Pb, it is possible to maintain good image planarity during zooming.

Furthermore, in the zoom lens, the negative lens group N is moved along the optical axis to focus on a close object from infinity. As described above, in a case where the positive lens group Pa and the positive lens group Pb are configured as one unit, by movably supporting the negative lens group N with respect to the unit, it is possible to suppress an eccentricity error caused by the movement of the negative lens group N even when the negative lens group N is directly driven by a stepping motor, an ultrasonic piezo motor, or the like during zooming and at the time of focusing. Therefore, even if the photographing distance changes according to the position of the subject, aberration fluctuation due to the eccentricity error can be suppressed, and a beautiful subject image can be obtained regardless of the photographing distance.

In addition, when the negative lens group N is configured with one lens element as described above, a lighter focusing group can be obtained, controllability of the focusing group can be improved, and quick autofocus can be achieved.

(4) Aperture Stop

In the zoom lens, the arrangement of the aperture stop is not particularly limited, but it is preferable to arrange the aperture stop between the first lens group and the positive lens group Pa in order to reduce the size and increase the aperture of the zoom lens. The zoom lens includes the first lens group having negative refractive power on the most object side. Therefore, when the aperture stop is arranged on the image side relative to the positive lens group Pa, the entrance pupil position is located on the image side in the entire zoom lens system. When the entrance pupil position is located on the image side, the front lens diameter increases, and it becomes difficult to downsize the zoom lens. Furthermore, in this case, it becomes difficult to sufficiently pass the off-axis pencil of light, and it becomes difficult to increase the aperture of the zoom lens while securing the peripheral light amount.

In a case where one or a plurality of lens groups are arranged between the first lens group and the positive lens group Pa, it is only required that the aperture stop is arranged between the lens surface on the most image side of the first lens group and the lens surface on the most object side of the positive lens group Pa, and the position of the aperture stop is not particularly limited as long as the lenses are arranged be the lens surfaces. However, in this case, in order to obtain the above effect, it is more preferable to arrange the aperture stop between the lens group arranged immediately before the object side of the positive lens group Pa and the positive lens group Pa.

(5) Operation During Zooming

In the zoom lens, magnification is changed by changing an interval on the optical axis between adjacent lens groups. At that time, as described above, it is assumed that the first lens group moves to the image side during zooming from the wide angle end to the telephoto end, and the positive lens group Pa and the positive lens group Pb move to the object side with the same locus. Except for these points, the orientation and movement amount of each lens group during zooming are not particularly limited. In addition, as long as the interval on the optical axis between the adjacent lens groups changes, each lens group may be a moving group that moves along the optical axis during zooming, or may be a fixed group that is fixed with respect to the imaging surface.

1-2. Conditional Expressions

In the zoom lens, it is preferable to adopt the above-described configuration and satisfy one or more conditional expressions described below.

1-2-1. Conditional Expression (1)

$$0.80<(Rnf+Rnr)/(Rnf-Rnr)<1.40 \quad (1)$$

where

Rnf is a curvature radius of a surface of a most object side in the negative lens group N, and Rnr is a curvature radius of a surface of a most image side in the negative lens group N.

The conditional expression (1) is an expression that defines the shapes of the entrance surface and the exit surface of the negative lens group N. By satisfying the conditional expression (1), variations in spherical aberration, image plane curvature, and distortion aberration during zooming can be suppressed, and these various aberrations can be favorably corrected. Therefore, even when the positive lens group Pa and the positive lens group Pb arranged in front of and behind the negative lens group N are moved with the identical locus during zooming, aberration fluctuation can be suppressed, and a zoom lens with high imaging performance can be obtained. In addition, in a case where the negative lens group N is used as a focusing group, it is possible to suppress fluctuation of spherical aberration when focusing on a close object, and possible to achieve a zoom lens having a high optical performance in the entire focusing range.

On the other hand, when the numerical value of the conditional expression (1) becomes equal to or less than the lower limit value, the action of bending, on the entrance surface of the negative lens group N, the light beam converged by the positive lens group Pa increases. In this case, since the fluctuation of the spherical aberration during zooming and at the time of focusing increases, it becomes difficult to move the positive lens group Pa and the positive lens group Pb with the same locus during zooming in order to obtain a zoom lens with high optical performance. Therefore, the positive lens group Pa and the positive lens group Pb cannot be configured as one unit, a mechanism for moving each lens group during zooming becomes complicated, a configuration of a lens barrel also becomes complicated, and downsizing of the entire zoom lens group becomes difficult. On the other hand, when the numerical value of the conditional expression (1) becomes equal to or greater than the upper limit value, the action of bending the off-axis ray on the exit surface of the negative lens group N increases. In this case, variations in image plane curvature and distortion aberration during zooming and at the time of focusing increase. Therefore, it becomes impossible to move the positive lens group Pa and the positive lens group Pb with the identical locus during zooming, and it becomes difficult to downsize the entire zoom lens group for the same reason as described above.

In order to obtain the above effect, the lower limit value of the conditional expression (1) is preferably 0.85, and more preferably 0.90. The upper limit value of the conditional expression (1) is preferably 1.35, more preferably 1.30, and yet more preferably 1.25. In addition, in the conditional expression (1), preferable numerical values of the lower limit value and the upper limit value can be appropriately selected, and in this case, the strict inequality sign (<) in the conditional expression (1) may be converted into the non-strict inequality sign (≤). The same applies to other conditional expressions.

1-2-2. Conditional Expression (2)

$$-1.20<fn/ft<-0.50 \quad (2)$$

where fn is a focal length of the negative lens group N, and ft is a focal length of the zoom lens at a telephoto end.

The conditional expression (2) is an expression that defines the ratio between the focal length of the negative lens group N and the focal length of the zoom lens at the telephoto end. By satisfying the conditional expression (2), the refractive power of the negative lens group N falls within an appropriate range, the movement amount of the negative lens group N during zooming can fall within an appropriate range, and it is possible to achieve a compact zoom lens having high optical performance in the entire magnification range.

On the other hand, when the numerical value of the conditional expression (2) becomes equal to or less than the lower limit value, the refractive power of the negative lens group N becomes weak, and it is necessary to increase the movement amount of the negative lens group N during zooming in order to perform good aberration correction in the entire magnification range. Therefore, it is difficult to downsize the zoom lens while maintaining high optical performance, and thus it is not preferable. On the other hand, when the numerical value of the conditional expression (2) becomes equal to or greater than the upper limit value, the refractive power of the negative lens group N becomes strong, and it is possible to reduce the movement amount of the negative lens group N during zooming. However, when the refractive power of the negative lens group N becomes strong, aberration fluctuation due to the movement of the negative lens group N becomes large. In order to obtain a zoom lens with high optical performance, it becomes difficult to move the positive lens group Pa and the positive lens group Pb with the identical locus during zooming, and it becomes difficult to downsize the entire zoom lens unit for the same reason as described above.

In order to obtain the above effect, the lower limit value of the conditional expression (2) is preferably −1.10, and more preferably −1.00. The upper limit value of the conditional expression (2) is preferably −0.55, and more preferably −0.60.

1-2-3. Conditional Expression (3)

$$-5.40 < (1-\beta nt^2) \times \beta rt^2 < -2.40 \quad (3)$$

where $\beta nt$ is a lateral magnification at the telephoto end of the negative lens group N, $\beta rt$ is a complex lateral magnification at the telephoto end of all the lens groups located on the image side relative to the negative lens group N.

The conditional expression (3) is an expression for defining the sensitivity of the negative lens group N. Here, the sensitivity represents the movement amount of the imaging plane when the lens group moves by a unit amount. When the negative lens group N is used as a focusing group, by satisfying the conditional expression (3), the movement amount of the negative lens group N at the time of focusing on a close object from infinity can fall within an appropriate range, control of the movement position of the negative lens group N at the time of focusing becomes easy, and downsizing of the zoom lens becomes easy.

On the other hand, when the numerical value of the conditional expression (3) becomes equal to or less than the lower limit value, the sensitivity of the negative lens group N increases. Therefore, when the negative lens group N is used as a focusing group, the movement amount of the negative lens group N when focusing on a close object becomes small, and thus, it is necessary to control the movement position of the negative lens group N at the time of focusing with extremely high accuracy, and the control sometimes becomes difficult. On the other hand, when the numerical value of the conditional expression (3) becomes equal to or greater than the upper limit value, the sensitivity of the negative lens group N decreases, and thus, when the negative lens group N is used as a focusing group, the movement amount of the negative lens group N when focusing on an in-focus close object increases. Therefore, it becomes difficult to downsize the zoom lens.

In order to obtain the above effect, the lower limit value of the conditional expression (3) is preferably −5.00, and more preferably −4.60. The upper limit value Of The conditional expression (3) is preferably −2.55, and more preferably −2.70.

1-2-4. Conditional Expression (4)

When the negative lens group N consists of one lens element, it is preferable satisfy the following condition.

$$vdn > 50 \quad (4)$$

where vdn is the Abbe number of the lens elements constituting the negative lens group N (when the lens element consists of a single lens, it refers to the Abbe number with respect to the d line of the single lens. When the lens element consists of a cemented lens, it refers to the Abbe number on the d line of a lens having the largest negative refractive power among a plurality of single lenses constituting the cemented lens.)

The conditional expression (4) is an expression that defines the Abbe number with respect to the d line of the negative lens element when the negative lens group N includes one lens element. By satisfying the conditional expression (4), it is possible to suppress the occurrence of chromatic aberration in the negative lens group N. Furthermore, in the zoom lens, for example, the axial chromatic aberration and the chromatic aberration of magnification are sometimes difficult to correct in a well-balanced manner, for example, the axial chromatic aberration can be corrected favorably at the wide angle end while the chromatic aberration of magnification increases, and the chromatic aberration of magnification can be corrected favorably at the telephoto end while the axial chromatic aberration increases. By satisfying the conditional expression (4), it becomes easy to correct both the axial chromatic aberration and the chromatic aberration of magnification in a well-balanced manner at both the wide angle end and the telephoto end. Furthermore, in the zoom lens, the negative lens group N is used as a focusing group, but by satisfying the conditional expression (4), it is possible to suppress the occurrence of the axial chromatic aberration due to the change in the photographing distance, and possible to favorably correct the chromatic aberration in the entire focusing range.

On the other hand, when the numerical value of the conditional expression (4) becomes equal to or less than the lower limit value, the chromatic dispersion of the lens elements constituting the negative lens group N increases, and hence it becomes difficult to correct the axial chromatic aberration and the chromatic aberration of magnification in a well-balanced manner. Furthermore, in a case where the negative lens group N is used as a focusing group to focus on a close object, correction of the axial chromatic aberration becomes difficult, and it is not preferable.

In order to obtain the above effect, the lower limit value of the conditional expression (4) is preferably 60, more preferably 65, and yet more preferably 70. On the other hand, the above effect is obtained by satisfying the conditional expression (4), and it is not necessarily define the upper limit value of the conditional expression (4). However, a glass material having a large Abbe number is more expensive than a glass material having a small Abbe number. In order to favorably correct the chromatic aberration, it is preferable to use a glass material having a large Abbe number, but the cost effectiveness decreases as the Abbe number increases. Therefore, from this viewpoint, the upper limit value of the conditional expression (4) is preferably equal to or less than 100, more preferably 95, and yet more preferably 85.

1-2-5. Conditional Expression (5)

$$-1.60 \leq XF/XR \leq -0.30 \quad (5)$$

where

XF is a movement distance on the optical axis during zooming of the first lens group from the wide angle end to the telephoto end, and XR is a movement distance on the optical axis during zooming of the positive lens group Pa from the wide angle end to the telephoto end.

The conditional expression (5) is an expression that defines the ratio in the movement distance between the first lens group and the positive lens group Pa (and the positive lens group Pb) during zooming from the wide angle end to the telephoto end. As described above, during zooming from the wide angle end to the telephoto end, the first lens group moves to the image side, and the positive lens group Pa and the positive lens group Pb move to the object side with the identical locus. At this time, XF is a positive value, and XR becomes a negative value. In addition, the movement distance means a distance between the position of each lens group at the wide angle end and the position of each lens group at the telephoto end.

In recent years, it has been practiced to capture of a moving image with an image device held or mounted on a gimbal (stabilizer), a drone, or the like. In the zoom lens, since each lens group moves during zooming, the barycentric position changes easily. In the negative-preceding type optical system, in the case of the retrofocus type refractive power arrangement at the wide angle end in particular, the entrance position of the maximum angle of view ray with respect to the front lens group (e.g., a first lens group or the like) becomes high. Therefore, the lens diameter of the front lens group is larger than that of the rear lens group, and the weight ratio of the front lens group in the entire optical system of the zoom lens becomes large. In the zoom lens, when the positive lens group Pa, the negative lens group N, the positive lens group Pb, the drive mechanism for focusing, and the like are unitized as described above, the weight ratio of them in the entire product also becomes large. Therefore, by moving the first lens group to the image side and moving the positive lens group Pa and the positive lens group Pb to the object side within a range that satisfies the conditional expression (5), it is possible to suppress a change in the barycentric position during zooming. Therefore, even when the image device is held by a gimbal or the like to capture a moving image, it is possible to suppress the tilt, rotation, and the like of the zoom lens due to the image blur and the change in the barycentric position.

On the other hand, when the numerical value of the conditional expression (5) comes out of the above range, it becomes difficult to adjust the balance between the weight of each lens group of the first lens group and the positive lens group Pa (and the positive lens group Pb) and the movement amount of each lens group during zooming, and it becomes difficult to suppress the change in the barycentric position during zooming.

In order to obtain the above effect, the lower limit value of the conditional expression (5) is preferably −1.50, and more preferably −1.40. The upper limit value of the conditional expression (5) is preferably −0.35, and more preferably −0.40.

1-2-6. Conditional Expression (6)

$$0.70 < Y\text{max}/BFw < 1.60 \quad (6)$$

where

Ymax is a maximum image height of the zoom lens,

BFw is back focus at the wide angle end of the zoom lens at the time of infinity focus The conditional expression (6) is an expression that defines the ratio between the maximum image height of the zoom lens and the back focus of the zoom lens at the wide angle end. However, the back focus refers to a distance on the optical axis from the lens surface arranged on the most image side in the zoom lens to the image plane. However, the lens surface arranged on the most image side refers to the lens surface arranged on the most image side among the lens surfaces substantially constituting the zoom lens. The lens surface substantially constituting the zoom lens does not include a cover glass or the like. When an optical element having no substantial refractive power such as a cover glass is included between the lens surface arranged on the most image side and the image plane, the thickness thereof is assumed to be converted into an air conversion length. By satisfying the conditional expression (6), it is possible to ensure appropriate back focus for an interchangeable lens of an image device that adopts an interchangeable lens system such as a mirrorless camera while achieving downsizing and wide angle of the zoom lens.

On the other hand, when the numerical value of the conditional expression (6) becomes equal to or less than the lower limit value, the back focus of the zoom lens becomes too long, and it becomes difficult to downsize the zoom lens. In this case, the asymmetry becomes strong due to the retrofocus type refractive power arrangement at the wide angle end. Therefore, the barrel type distortion aberration occurring on the object side becomes large. On the other hand, when the numerical value of the conditional expression (6) becomes equal to or greater than the upper limit value, the back focus of the zoom lens becomes too short, and it becomes difficult to secure appropriate back focus for the interchangeable lens.

In order to obtain the above effect, the lower limit value of the conditional expression (6) is preferably 0.85, more preferably 0.95, and yet more preferably 1.10. The upper limit value of the conditional expression (6) is preferably 1.55, more preferably 1.50, and yet more preferably 1.45.

1-2-7. Conditional Expression (7)

$$0.50 < \beta prt/\beta prw < 1.70 \quad (7)$$

where $\beta prw$ is a lateral magnification of the positive lens group Pb at the wide angle end, $\beta prt$ is a lateral magnification of the positive lens group Pb at the telephoto end.

The conditional expression (7) is an expression that defines a ratio between the lateral magnification of the positive lens group Pb at the wide angle end and the lateral magnification of the positive lens group Pb at the telephoto end. As described above, the ray height of the maximum off-axis pencil of light entering the positive lens group Pb varies with the magnification operation of the zoom lens. By satisfying the conditional expression (6), coma aberration and image plane curvature can be effectively corrected, and a zoom lens with high optical performance can be achieved in the entire magnification range. A this time, it is more preferable to configure the positive lens group Pb to include at least one asphere.

On the other hand, when the numerical value of the conditional expression becomes equal to or less than the lower limit value or the numerical value of the conditional expression (7) becomes equal to or greater than the upper limit value, the difference in the ray height of the maximum off-axis pencil of light entering the positive lens group Pb at the wide angle end and the telephoto end increases. Therefore, it is difficult to favorably correct the coma aberration and the image plane curvature at both the wide angle end and the telephoto end.

In order to obtain the above effect, the lower limit value of the conditional expression (7) is preferably 0.6, and more preferably 0.7. The upper limit value of the conditional expression (7) is preferably 1.4, more preferably 1.3, and yet more preferably 1.2.

2. Image Device

Next, an image device according to the present invention will be described. The image device according to the present invention includes: the zoom lens according to the present invention; and an image sensor that is provided on an image plane side of the zoom lens and converts an optical image formed by the zoom lens into an electrical signal.

Here, the image sensor and the like are not particularly limited, and a solid-state image sensor such as a charge coupled device (CCD) sensor or a complementary metal oxide semiconductor (CMOS) sensor can also be used. The image device according to the present invention is suitable for an image device using these solid-state image sensors such as a digital camera and a video camera. Furthermore, the image device may be a lens fixed type image device in which the lens is fixed to the housing, or may be a lens interchangeable type image device such as a single lens reflex camera or a mirrorless camera.

It is more preferable that the image device includes an image processing unit that electrically processes captured image data acquired by the solid-state image sensor to change the shape of the captured image, and an image correction data holding unit that holds image correction data, an image correction program, and the like that are used for processing the captured image data in the image processing unit. In a case where the zoom lens is downsized, strain (distortion) of the shape of the captured image formed on the imaging plane occurs easily. At that time, it is preferable that the image correction data holding unit holds, in advance, strain correction data for correcting strain of the shape of the captured image, and the image processing unit corrects the strain of the shape of the captured image using the strain data held in the image correction data holding unit. According to such an image device, the zoom lens can be further downsized, a beautiful captured image can be obtained, and the entire image device can be downsized.

Furthermore, in the image device according to the present invention, it is preferable that the image correction data holding unit holds, in advance, chromatic aberration of magnification correction data, and the image processing unit performs the chromatic aberration of magnification correction of the captured image using the chromatic aberration of magnification correction data held in the image correction data holding unit. The image processing unit corrects the chromatic aberration of magnification, i.e., the chromatic distortion aberration, whereby the number of lenses constituting the optical system can be reduced. Therefore, according to such an image device, the zoom lens can be further downsized, a beautiful captured image can be obtained, and the entire image device can be downsized.

Next, the present invention will be specifically described with reference to embodiments. However, the present invention is not limited to the following embodiments.

First Embodiment (1) Optical Configuration of Zoom Lens

FIG. 1 is a lens cross-sectional view illustrating the lens configuration of a zoom lens according to a first embodiment of the present invention. However, the upper stage indicates the wide angle end, the middle stage indicates the intermediate focal length state, and the lower stage indicates the state of the telephoto end.

The zoom lens includes, in order from an object side, a first lens group G1 having negative refractive power, a second lens group G2 having positive refractive power, a third lens group G3 having positive refractive power, a fourth lens group G4 having negative refractive power, and a fifth lens group G5 having positive refractive power, and performs magnification by changing an interval on an optical axis between adjacent lens groups. In the present embodiment, the third lens group G3 is the positive lens group Pa in the present invention, the fourth lens group G4 is the negative lens group N in the present invention, and the fifth lens group G5 is the positive lens group Pb in the present invention.

Hereinafter, the configuration of each lens group will be described. The first lens group G1 includes a cemented lens in which a negative meniscus lens having a concave shape on the image side, a biconcave lens, and a positive meniscus lens having a concave shape on the image side are cemented in order from the object side.

The second lens group G2 includes a biconvex lens and a negative meniscus lens having a convex shape on the image side in order from the object side.

The third lens group G3 includes, in order from the object side, an aperture stop S, a biconvex lens, and a cemented lens in which a negative meniscus lens having a concave shape on the image side and the biconvex lens are cemented.

The fourth lens group G4 includes a negative meniscus lens having a concave shape on the image side. That is, the fourth lens group G4 includes one single lens element.

The fifth lens group G5 includes, in order from the object side, a biconvex lens, a biconcave lens, and a negative meniscus lens having a convex shape on the image side.

In the zoom lens according to the first embodiment, with respect to the image plane during zooming from the wide end to the telephoto end, the first lens group G1 moves to the image side, the second lens group G2 moves to the object side, the third lens group G3 and the fifth lens group G5 move to the object side with the identical locus, and the fourth lens group G4 moves to the object side. When focusing on a close object from infinity, the fourth lens group G4 moves to the image side.

In FIG. 1, "IP" indicates an imaging plane, and specifically an imaging surface of a solid-state image sensor such as a CCD sensor and a CMOS sensor or a film plane of a silver salt film. In addition, a parallel flat plate having no substantial refractive power such as a cover glass CG is provided on the object side of an imaging plane IP. These points are similar in each lens cross-sectional view shown in other embodiments, and thus the description thereof will be omitted below.

(2) Numerical Value Examples

Next, numerical examples to which specific numerical values of the zoom lens are applied will be described. Hereinafter, "surface data", "aspherical data", "magnification data (at the time of infinity focusing)", "magnification data (at the time of finite distance object focusing)", and "focal length data of each lens group" of the zoom lens will be described. In addition, the value of each expression (conditional expression corresponding value) is collectively presented after the sixth embodiment.

In the "surface data", the "surface number" indicates the order of the lens surface counted from the object side, "r" indicates the curvature radius of the lens surface, "d" indicates the interval on the optical axis of the lens surface, "nd" indicates the refractive index with respect to the d line (wavelength $\lambda=587.6$ nm), and "vd" indicates the Abbe number with respect to the d line. In addition, "*" displayed next to the surface number indicates that the lens surface is an asphere, and "S" indicates an aperture stop. Furthermore, "d5", "d9", or the like indicated in the field of the interval on the optical axis of the lens surface means that the interval on the optical axis of the lens surface is a variable interval that changes during zooming. In each table, all units of the length are in "mm", and all units of the angle of view is all "°". In addition, "∞" in the column of the curvature radius means a plane. A 24th surface and a 25th surface in Table 1 are surface data of cover glass CG.

The "aspherical data" indicates an aspherical coefficient of each asphere. However, the asphere is assumed to be defined by the following expression with x as a displacement amount from a surface vertex in the optical axis direction.

$$x=(h^2/r)/[1+\{1-(1+k)\times(h/r)^2\}^{1/2}]+A4\times h^4+A6/h^6+A8\times h^8+A10\times h^{10}+A12\times h^{12}$$

In the above expression, h represents a height from the optical axis, r represents a paraxial curvature radius, k represents a conic coefficient, and An represents an n-th aspheric coefficient. In [Aspherical data], "E±XX" represents an exponential notation and means "×10$^{\pm XX}$".

The "magnification data (at the time of infinity focusing)" indicates the focal length, the "Fno" (F value), the "image height", and each variable interval of the zoom lens at the time of infinity focusing at the wide angle end, the intermediate focal length, and the telephoto end. The "magnification data (at the time of finite distance object focusing)" indicates each variable interval at the time of finite distance object focusing at a predetermined photographing distance. The "focal length data of each lens group" indicates the focal length of each lens group constituting the zoom lens. Since the matters related to the table are the same in each table shown in the other embodiments, the description thereof will be omitted below.

Figure 2:
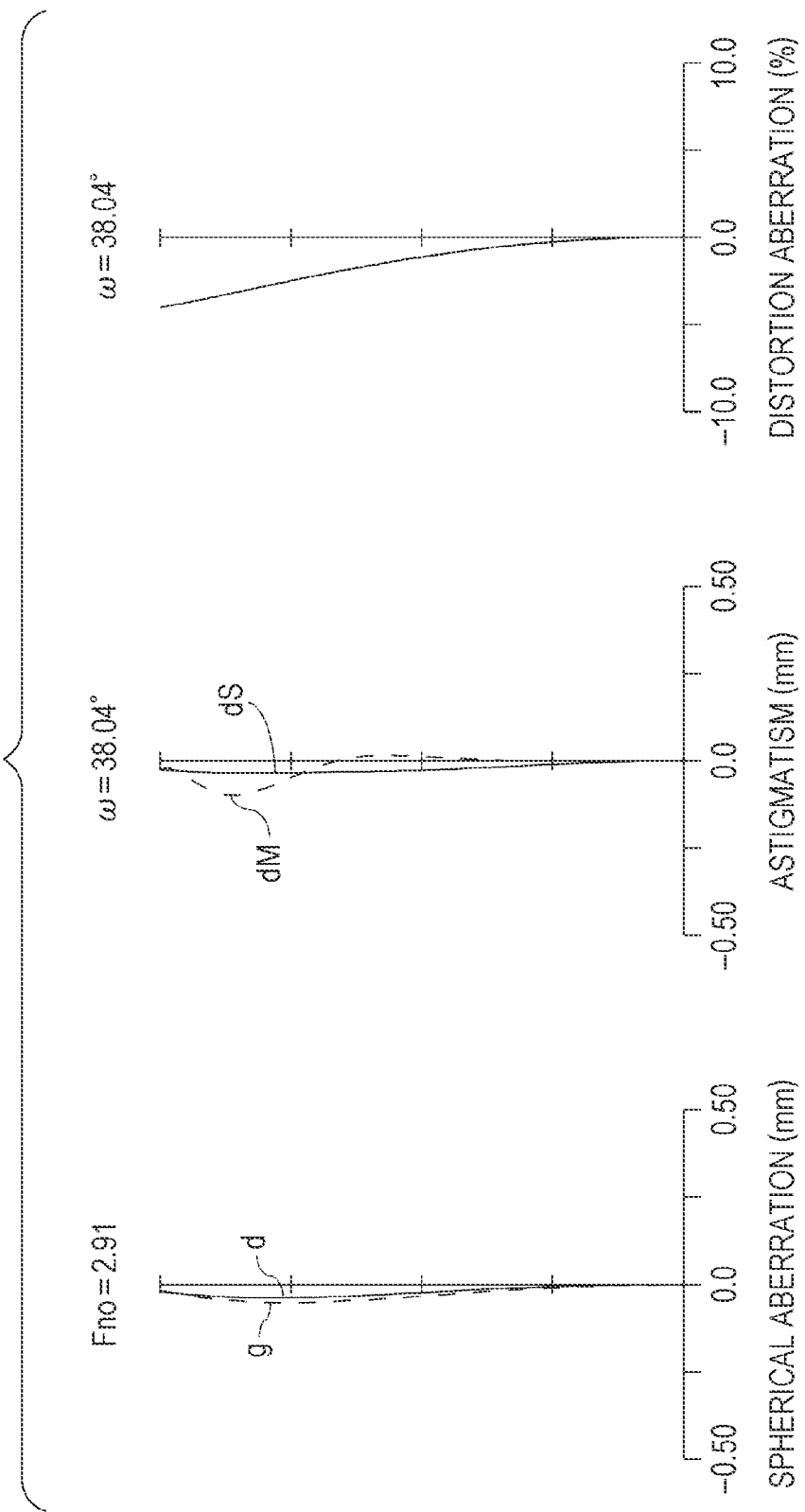
FIG. 2 is an aberration diagram of the zoom lens according to a first embodiment at a wide angle end at the time of infinity focus.
Figure 3:
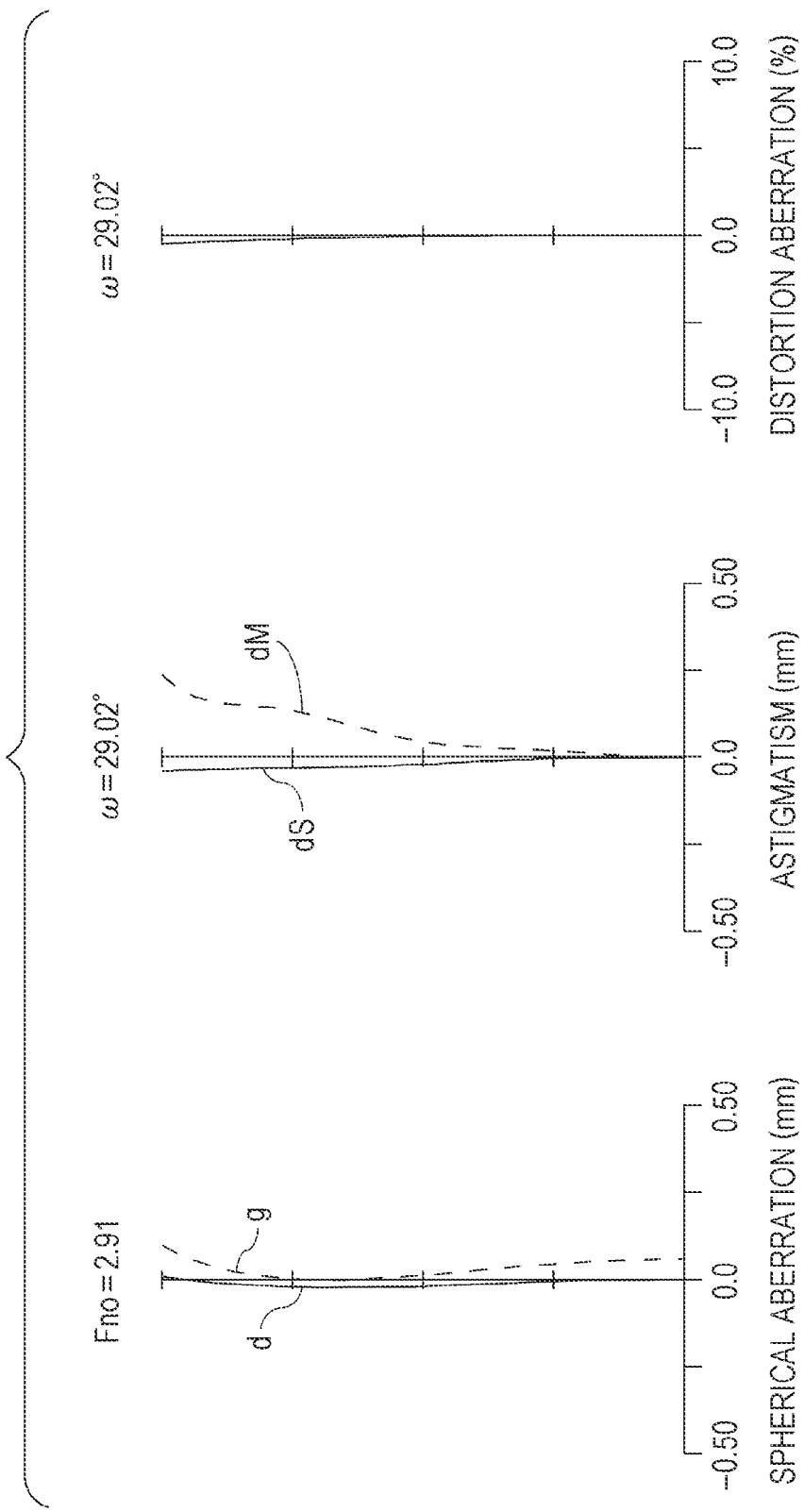
FIG. 3 is an aberration diagram of the zoom lens according to the first embodiment at an intermediate focal length at the time of infinity focus.
Figure 4:
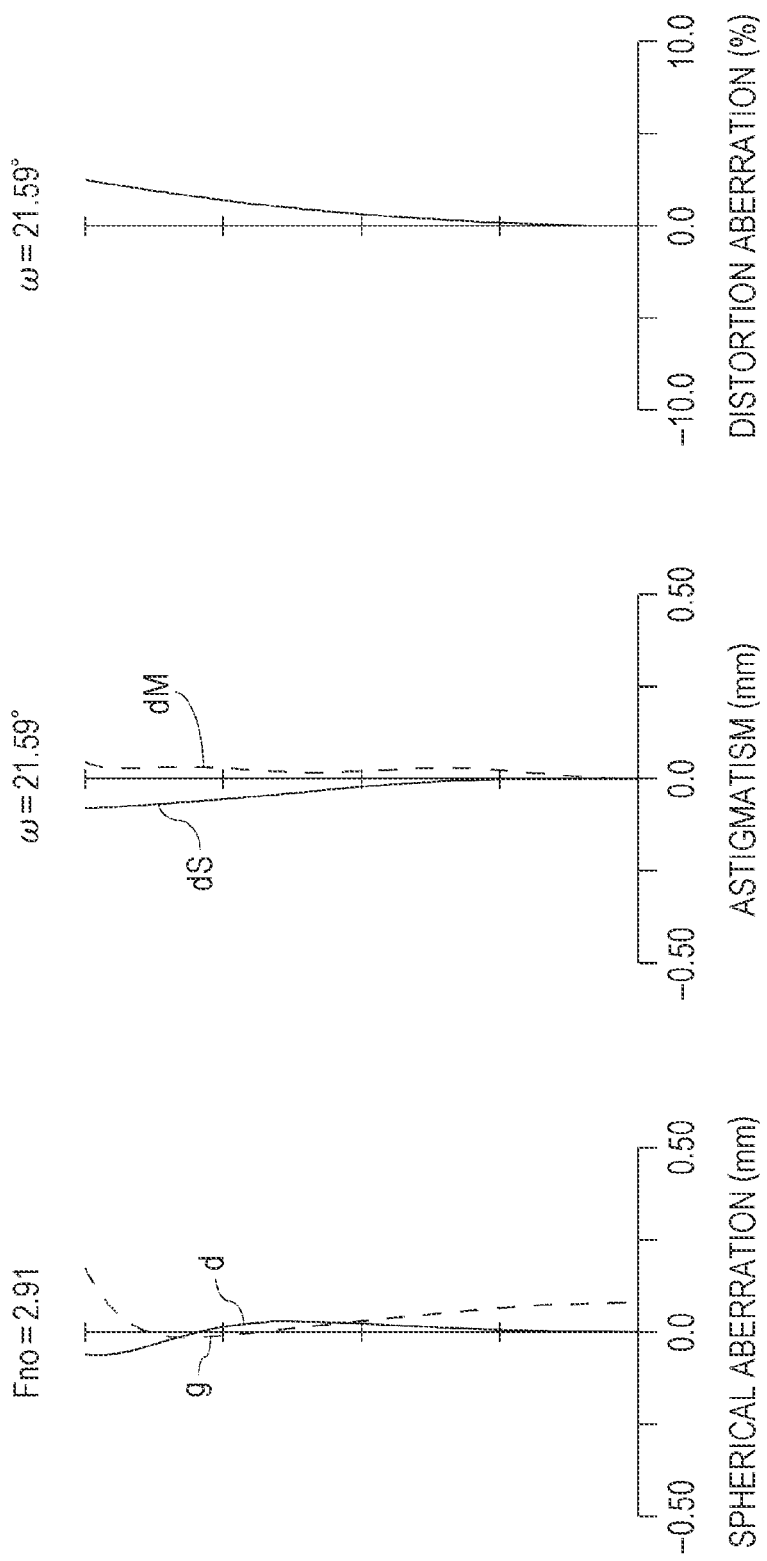
FIG. 4 is an aberration diagram of the zoom lens according to the first embodiment at a telephoto end at the time of infinity focus.

FIGS. 2 to 4 illustrate longitudinal aberration diagrams of the zoom lens at the time of infinity focusing at the wide angle end, the intermediate focal length, and the telephoto end. The longitudinal aberration diagrams illustrated in each figure are spherical aberration (mm), astigmatism (mm), and distortion aberration (%) in order from the left side. In the spherical aberration diagram, the solid line indicates spherical aberration at the d line (wavelength is 587.6 nm), and the broken line indicates spherical aberration at the g line (wavelength is 435.8 nm). In the astigmatism diagram, the vertical axis indicates the half angle of view ($\omega$), the horizontal axis indicates the defocus, the solid line indicates the sagittal image plane (dS) of the d line, and the broken line indicates the meridional image plane (dM) of the d line. In the distortion aberration diagram, the vertical axis indicates the half angle of view ($\omega$), and the horizontal axis represents the distortion aberration. These matters are the same in the aberration diagrams illustrated in the other embodiments, and thus the description thereof will be omitted below.

| Surface numbers | r | d | nd | vd |
|---|---|---|---|---|
| 1 | 40.511 | 1.500 | 1.61997 | 63.88 |
| 2 | 21.676 | 14.640 | | |
| 3 | −1653.720 | 1.100 | 1.49700 | 81.61 |
| 4 | 36.543 | 2.800 | 1.82115 | 24.06 |
| 5* | 47.383 | (d5) | | |
| 6 | 42.628 | 3.700 | 1.78880 | 28.43 |
| 7 | −433.932 | 2.640 | | |
| 8 | −45.205 | 1.000 | 1.78472 | 25.68 |
| 9 | −779.660 | (d9) | | |
| 10S | ∞ | 1.600 | | |
| 11* | 42.515 | 5.400 | 1.49710 | 81.56 |
| 12* | −48.214 | 0.600 | | |
| 13 | 32.619 | 1.000 | 1.76182 | 26.52 |
| 14 | 19.703 | 9.800 | 1.49700 | 81.61 |
| 15 | −30.994 | (d15) | | |
| 16 | 162.690 | 0.800 | 1.62299 | 58.16 |
| 17 | 18.688 | (d17) | | |
| 18 | 62.621 | 6.400 | 1.78590 | 44.20 |
| 19 | −25.103 | 0.200 | | |
| 20 | −33.110 | 1.000 | 1.51680 | 64.20 |
| 21 | 43.245 | 5.150 | | |
| 22* | −47.465 | 4.800 | 1.80610 | 40.73 |
| 23* | −308.703 | (d23) | | |
| 24 | ∞ | 2.500 | 1.51680 | 64.17 |
| 25 | ∞ | 1.000 | | |

-continued

[Aspherical surface data]

| Surface numbers | k | A4 | A6 | A8 | A10 | A12 |
|---|---|---|---|---|---|---|
| 5 | 0 | −3.99470E−06 | −2.28741E−09 | −3.62738E−11 | 1.36932E−13 | −2.19282E−16 |
| 11 | 0 | −1.74483E−05 | 2.09696E−09 | −2.82624E−10 | 1.62458E−12 | −5.93895E−15 |
| 12 | 0 | 7.74171E−06 | 7.46727E−09 | −2.21089E−10 | 1.31945E−12 | −4.87961E−15 |
| 22 | 0 | −9.85489E−05 | 3.41633E−07 | −1.55834E−09 | 4.72082E−12 | −5.47210E−15 |
| 23 | 0 | −8.19989E−05 | 3.80646E−07 | −1.53795E−09 | 4.39500E−12 | −5.30103E−15 |

[Magnification data (at the time of infinity focusing)]

|  | Wide angle | Intermediate | Telephoto |
|---|---|---|---|
| Focal length | 28.838 | 39.200 | 53.342 |
| Fno | 2.91 | 2.91 | 2.91 |
| Image height | 21.633 | 21.633 | 21.633 |
| d5 | 14.746 | 7.808 | 2.377 |
| d9 | 14.584 | 8.359 | 1.500 |
| d15 | 2.668 | 2.200 | 3.060 |
| d17 | 9.930 | 10.398 | 9.537 |
| d23 | 13.000 | 20.877 | 28.159 |

[Magnification data (at the time of finite distance focusing)]

|  | Wide angle | Intermediate | Telephoto |
|---|---|---|---|
| Photographing distance | 330.0 | 330.0 | 330.0 |
| d15 | 3.940 | 3.969 | 5.771 |
| d17 | 8.657 | 8.629 | 6.826 |

[Focal length data of each lens group]

| Group | Range | Focal length |
|---|---|---|
| G1 | 1-5 | −42.850 |
| G2 | 6-9 | 185.268 |
| G3 | 10-15 | 23.397 |
| G4 | 16-17 | −33.962 |
| G5 | 18-23 | 224.153 |
| CG | 24-25 | ∞ |

Second Embodiment (1) Optical Configuration of Zoom Lens

Figure 5:
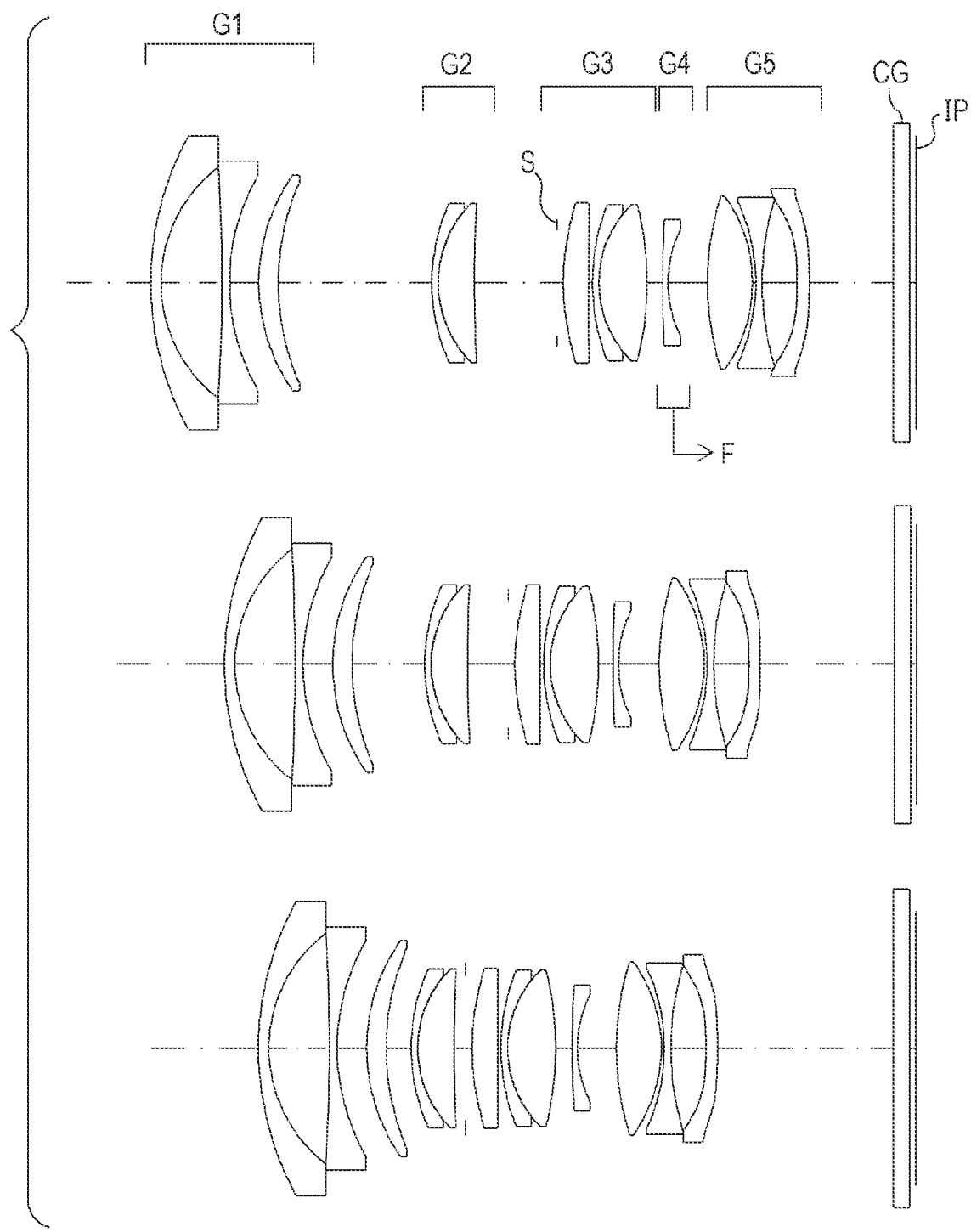
FIG. 5 is a lens cross-sectional view of a zoom lens according to a second embodiment at the time of infinity focus.

FIG. 5 is a lens cross-sectional view illustrating the lens configuration of a zoom lens according to a second embodiment of the present invention. The zoom lens includes, in order from an object side, a first lens group G1 having negative refractive power, a second lens group G2 having positive refractive power, a third lens group G3 having positive refractive power, a fourth lens group G4 having negative refractive power, and a fifth lens group G5 having positive refractive power, and performs magnification by changing an interval on an optical axis between adjacent lens groups. In the present embodiment, the third lens group G3 is the positive lens group Pa in the present invention, the fourth lens group G4 is the negative lens group N in the present invention, and the fifth lens group G5 is the positive lens group Pb in the present invention.

Hereinafter, the configuration of each lens group will be described. The first lens group G1 includes a negative meniscus lens having a concave shape on the image side, a biconcave lens, and a positive meniscus lens having a concave shape on the image side in order from the object side.

The second lens group G2 includes a cemented lens in which a negative meniscus lens having a concave shape on the image side and a positive meniscus lens having a concave shape on the image side are cemented in order from the object side.

The third lens group G3 includes, in order from the object side, the aperture stop S, a positive meniscus lens having a concave shape on the image side, and a cemented lens in which a negative meniscus lens having a concave shape on the image side and a biconvex lens are cemented.

The fourth lens group G4 includes a negative meniscus lens having a concave shape on the image side. That is, the fourth lens group G4 includes one single lens element.

The fifth lens group G5 includes, in order from the object side, a biconvex lens, a biconcave lens, and a negative meniscus lens having a convex shape on the image side.

In the zoom lens according to the second embodiment, with respect to the image plane during zooming from the wide end co the telephoto end, the first lens group G1 moves to the image side, the second lens group G2 moves to the object side, the third lens group G3 and the fifth lens group G5 move to the object side with the identical locus, and the fourth lens group G4 moves to the object side. When focusing on a close object from infinity, the fourth lens group G4 moves to the image side.

(2) Numerical Value Examples

Figure 6:
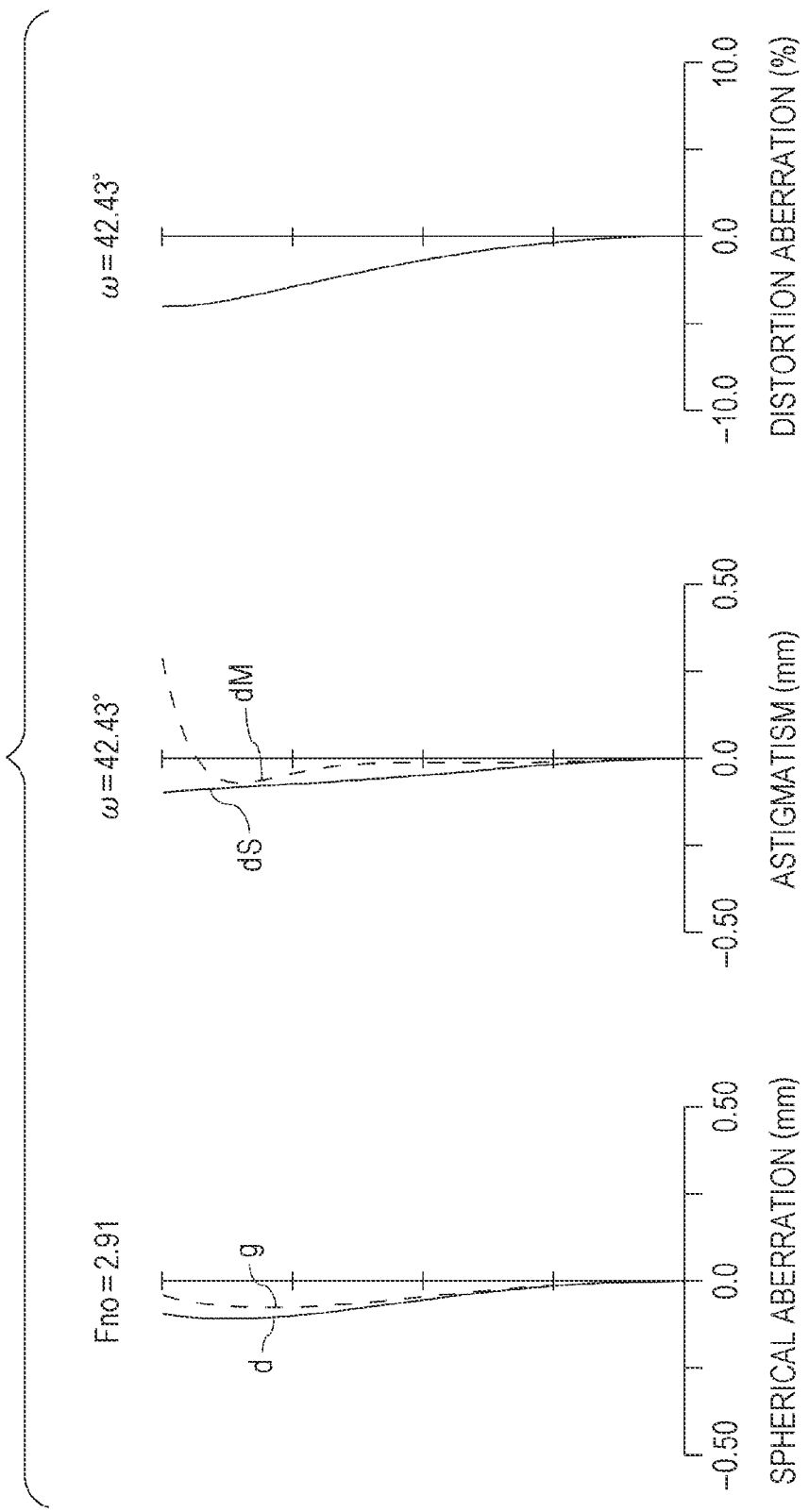
FIG. 6 is an aberration diagram of the zoom lens according to het second embodiment at a wide angle end at the time of infinity focus.
Figure 7:
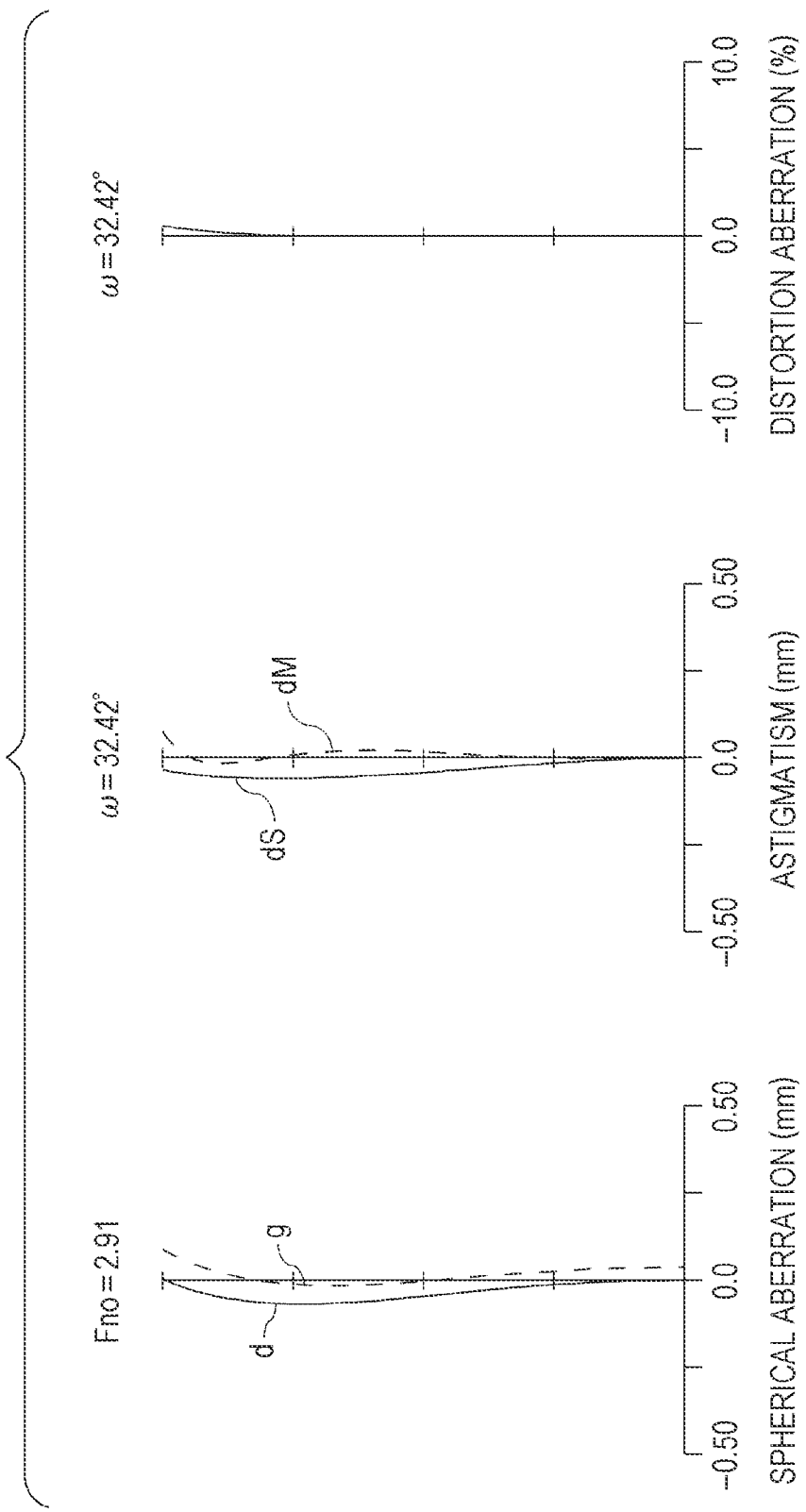
FIG. 7 is an aberration diagram of the zoom lens according to the second embodiment at an intermediate focal length at the time of infinity focus.
Figure 8:
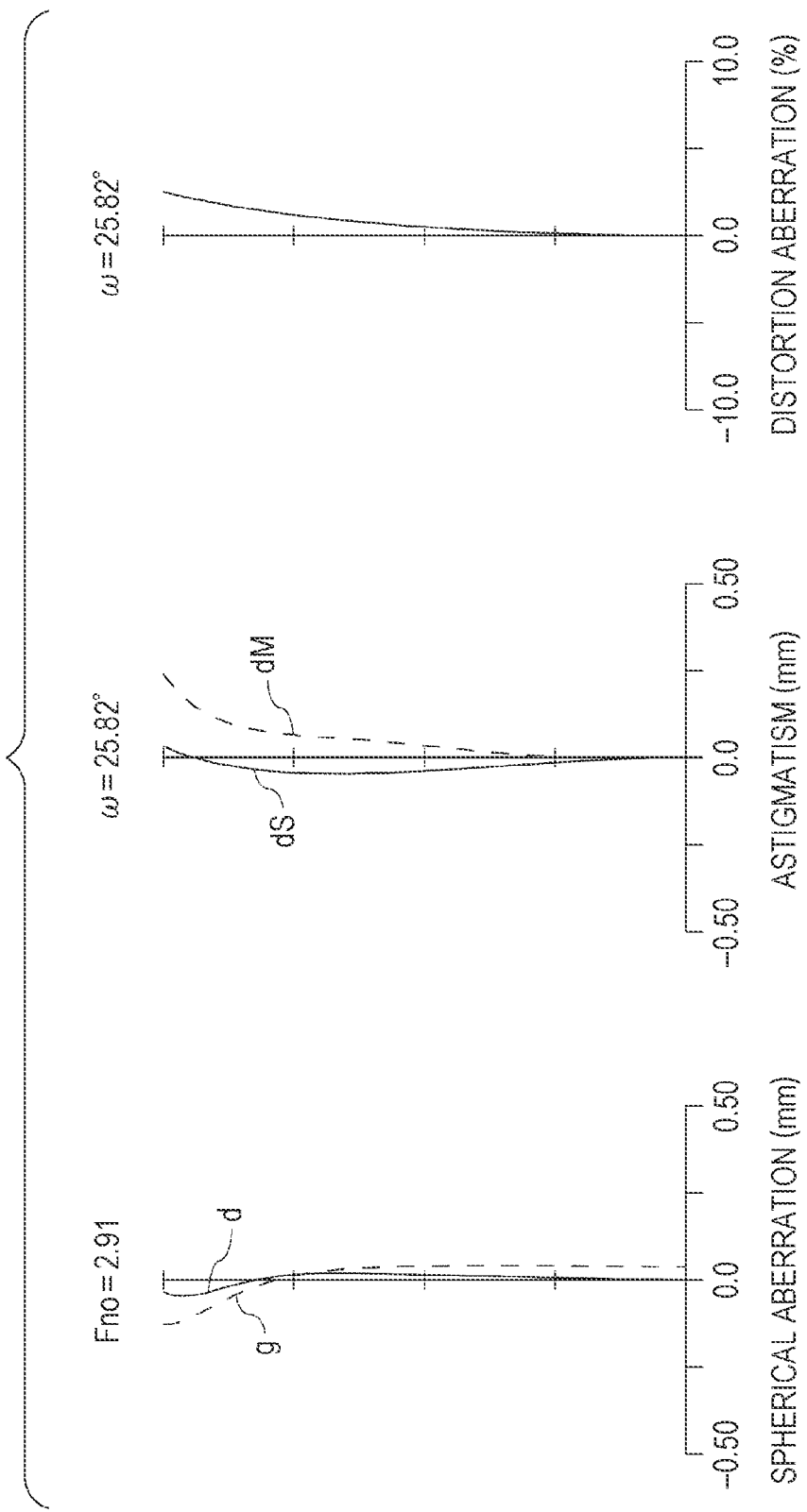
FIG. 8 is an aberration diagram of the zoom lens according to the second embodiment at a telephoto end at the time of infinity focus.

Next, numerical examples to which specific numerical values of the zoom lens are applied will be described. Hereinafter, "surface data", "aspherical data", "magnification data (at the time of infinity focusing)", "magnification data (at the time of finite distance object focusing)", and "focal length data of each lens group" of the zoom lens will be described. FIGS. 6 to 8 illustrate longitudinal aberration diagrams of the zoom lens at the time of infinity focusing at the wide angle end, the intermediate focal length, and the telephoto end.

[Surface data]

| Surface numbers | r | d | nd | vd |
|---|---|---|---|---|
| 1 | 46.855 | 1.600 | 1.72916 | 54.67 |
| 2 | 22.331 | 9.300 | | |
| 3 | −305.021 | 1.200 | 1.49700 | 81.61 |
| 4 | 33.148 | 4.540 | | |
| 5 | 28.960 | 3.000 | 1.84666 | 23.78 |
| 6 | 38.886 | (d6) | | |
| 7 | 29.665 | 1.000 | 1.83481 | 42.72 |
| 8 | 17.416 | 5.600 | 1.61800 | 63.39 |
| 9 | 264.044 | (d9) | | |
| 10S | ∞ | 1.000 | | |
| 11* | 35.221 | 3.900 | 1.59349 | 67.00 |
| 12 | 3482.550 | 0.590 | | |
| 13 | 32.402 | 1.000 | 1.64769 | 33.84 |
| 14 | 16.844 | 7.400 | 1.49700 | 81.61 |
| 15 | −49.342 | (d15) | | |
| 16 | 188.613 | 0.800 | 1.69680 | 55.46 |
| 17 | 18.246 | (d17) | | |
| 18 | 44.715 | 6.895 | 1.77250 | 49.62 |
| 19 | −22.886 | 0.480 | | |
| 20 | −29.688 | 1.000 | 1.54814 | 45.82 |
| 21 | 43.522 | 5.400 | | |
| 22* | −62.525 | 1.800 | 1.80604 | 40.74 |
| 23* | −203.845 | (d23) | | |
| 24 | ∞ | 2.500 | 1.51680 | 64.17 |
| 25 | ∞ | 1.000 | | |

[Aspherical surface data]

| Surface numbers | k | A4 | A6 | A8 | A10 | A12 |
|---|---|---|---|---|---|---|
| 11 | 0 | −1.27379E−05 | −1.06984E−08 | −8.12515E−11 | 6.82657E−13 | −2.30405E−15 |
| 22 | 0 | −1.22699E−04 | 1.55487E−07 | 3.44562E−10 | −1.12741E−12 | 1.66430E−14 |
| 23 | 0 | −1.00224E−04 | 2.67618E−07 | −8.68046E−11 | 1.90506E−14 | 3.72873E−15 |

[Magnification data (at the time of infinity focusing)]

| | Wide angle | Intermediate | Telephoto |
|---|---|---|---|
| Focal length | 24.719 | 33.901 | 43.645 |
| Fno | 2.91 | 2.91 | 2.91 |
| Image height | 21.633 | 21.633 | 21.633 |
| d6 | 23.636 | 11.183 | 3.853 |
| d9 | 12.600 | 6.233 | 1.737 |
| d15 | 2.435 | 2.238 | 2.553 |
| d17 | 6.108 | 6.305 | 5.990 |
| d23 | 13.000 | 20.573 | 26.992 |

[Magnification data (at the time of finite distance focusing)]

| | Wide angle | Intermediate | Telephoto |
|---|---|---|---|
| Photographing distance | 300.0 | 300.0 | 300.0 |
| d15 | 3.661 | 4.016 | 5.051 |
| d17 | 4.882 | 4.527 | 3.492 |

[Focal length data of each lens group]

| Group | Range | Focal length |
|---|---|---|
| G1 | 1-6 | −38.660 |
| G2 | 7-9 | 72.953 |
| G3 | 10-15 | 28.299 |
| G4 | 16-17 | −29.045 |
| G5 | 18-23 | 72.482 |
| CG | 24-25 | ∞ |

Third Embodiment

(1) Optical Configuration of Zoom Lens

Figure 9:
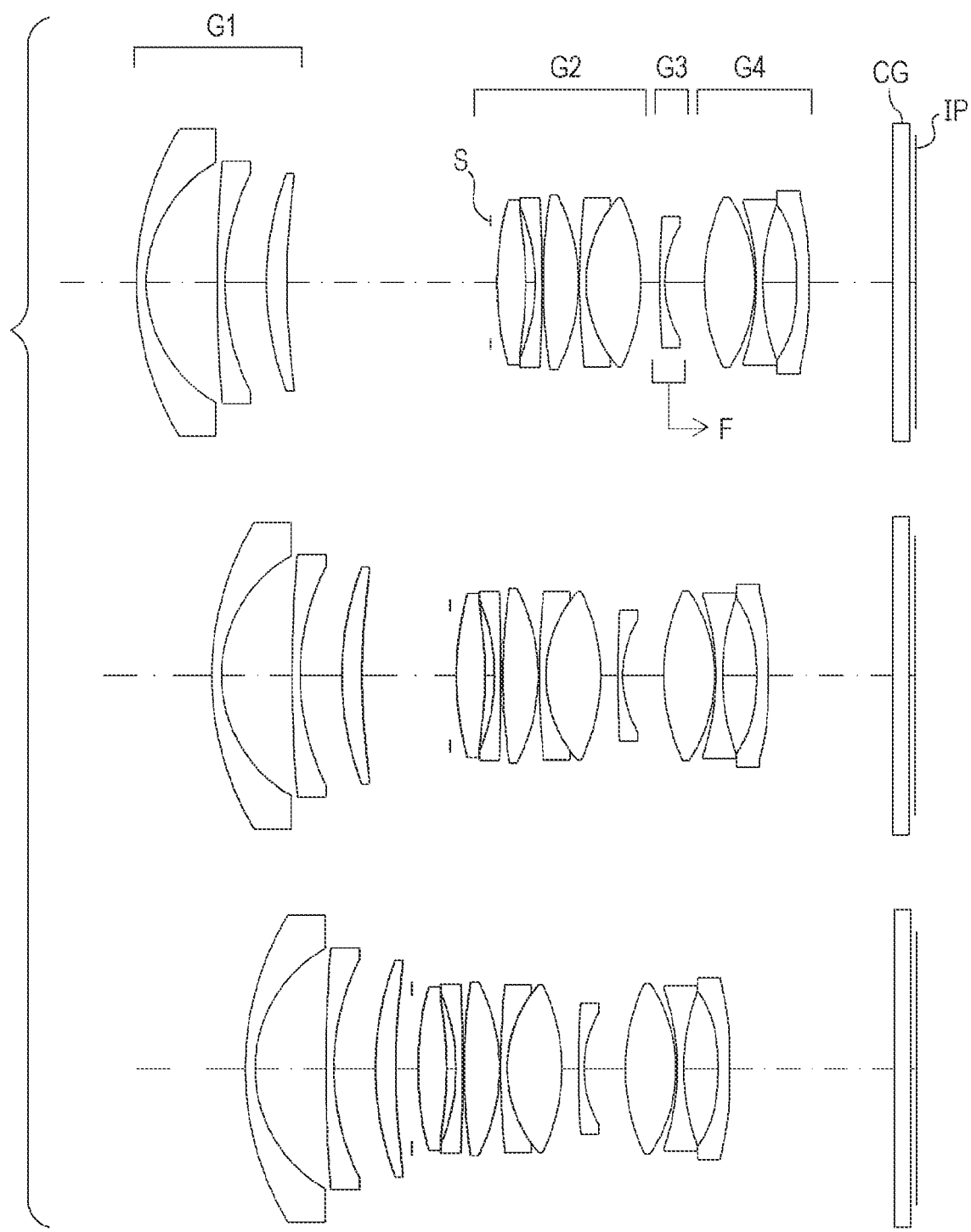
FIG. 9 is a lens cross-sectional view of a zoom lens according to a third embodiment at the time of infinity focus.

FIG. 9 is a lens cross-sectional view illustrating the lens configuration of a zoom lens according to a third embodiment of the present invention. The zoom lens includes, in order from an object side, a first lens group G1 having negative refractive power, a second lens group G2 having positive refractive power, a third lens group G3 having negative refractive power, and a fourth lens group G4 having positive refractive power, and performs magnification by changing an interval on an optical axis between adjacent lens groups. In the present embodiment, the second lens group G2 is the positive lens group Pa in the present invention, the third lens group G3 is the negative lens group N in the present invention, and the fourth lens group G4 is the positive lens group Pb in the present invention.

Hereinafter, the configuration of each lens group will be described. The first lens group G1 includes a negative meniscus lens having a concave shape on the image side, a negative meniscus lens having a concave shape on the image side, and a positive meniscus lens having a concave shape on the image side in order from the object side.

The second lens group G2 includes, in order from the object side, the aperture stop S, a biconvex lens, a negative meniscus lens having a convex shape on the image side, a biconvex lens, and a cemented lens in which a negative meniscus lens having a concave shape on the image side and a biconvex lens are cemented.

The third lens group G3 includes a negative meniscus lens having a concave shape on the image side. That is, the third lens group G3 includes one single lens element.

The fourth lens group G4 includes a biconvex lens, a biconcave lens, and a negative meniscus lens having a convex shape on the image side in order from the object side.

In the zoom lens according to the third embodiment, with respect to the image plane during zooming from the wide end to the telephoto end, the first lens group G1 moves to the image side, the second lens group G2 and the fourth lens group G4 move to the object side with the identical locus, and third lens group G3 moves to the object side. When focusing on a close object from infinity, the third lens group G3 moves to the image side.

(2) Numerical Value Examples

Figure 10:
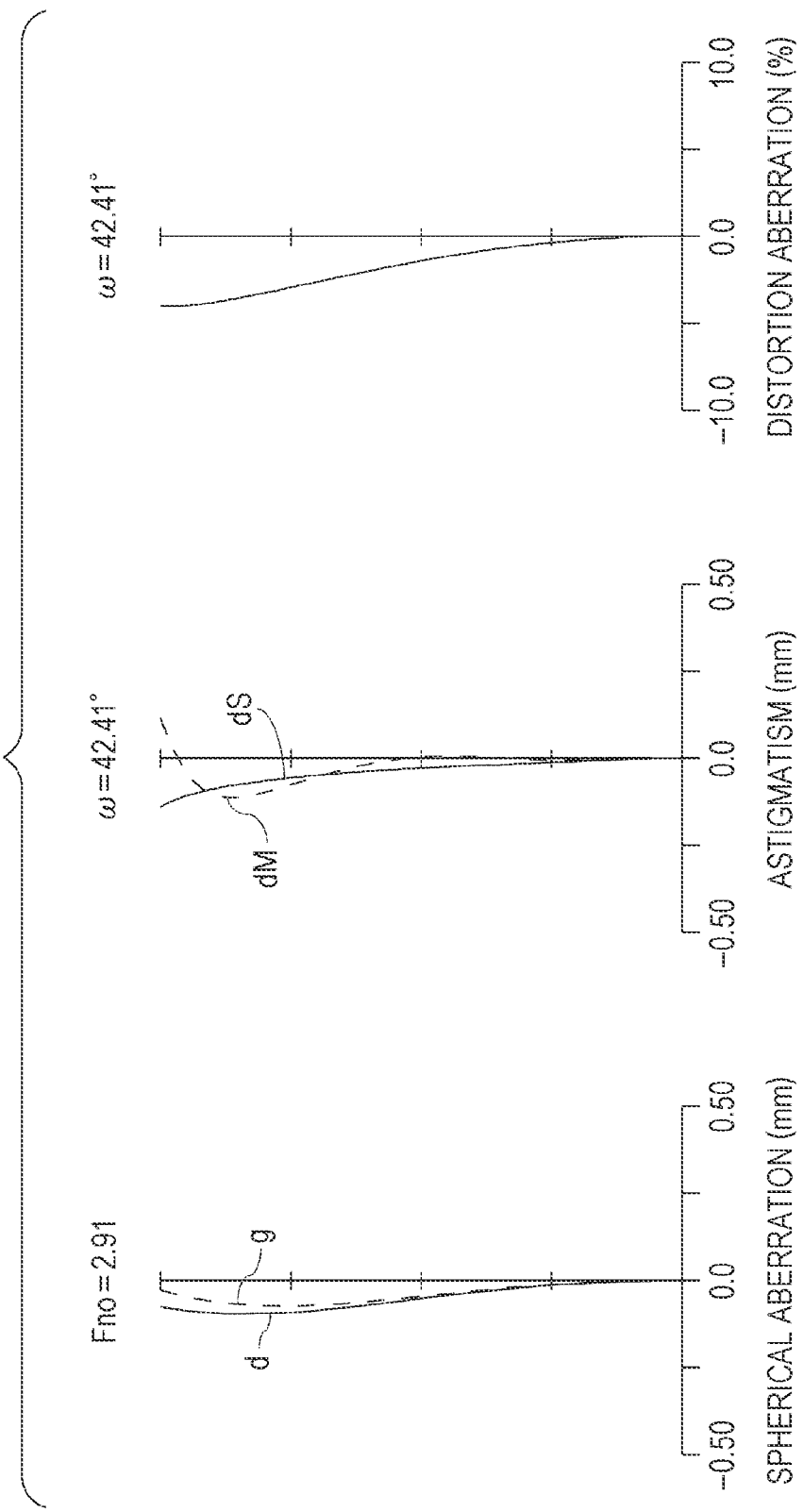
FIG. 10 is an aberration diagram of the zoom lens according to the third embodiment at a wide angle end at the time of infinity focus.
Figure 11:
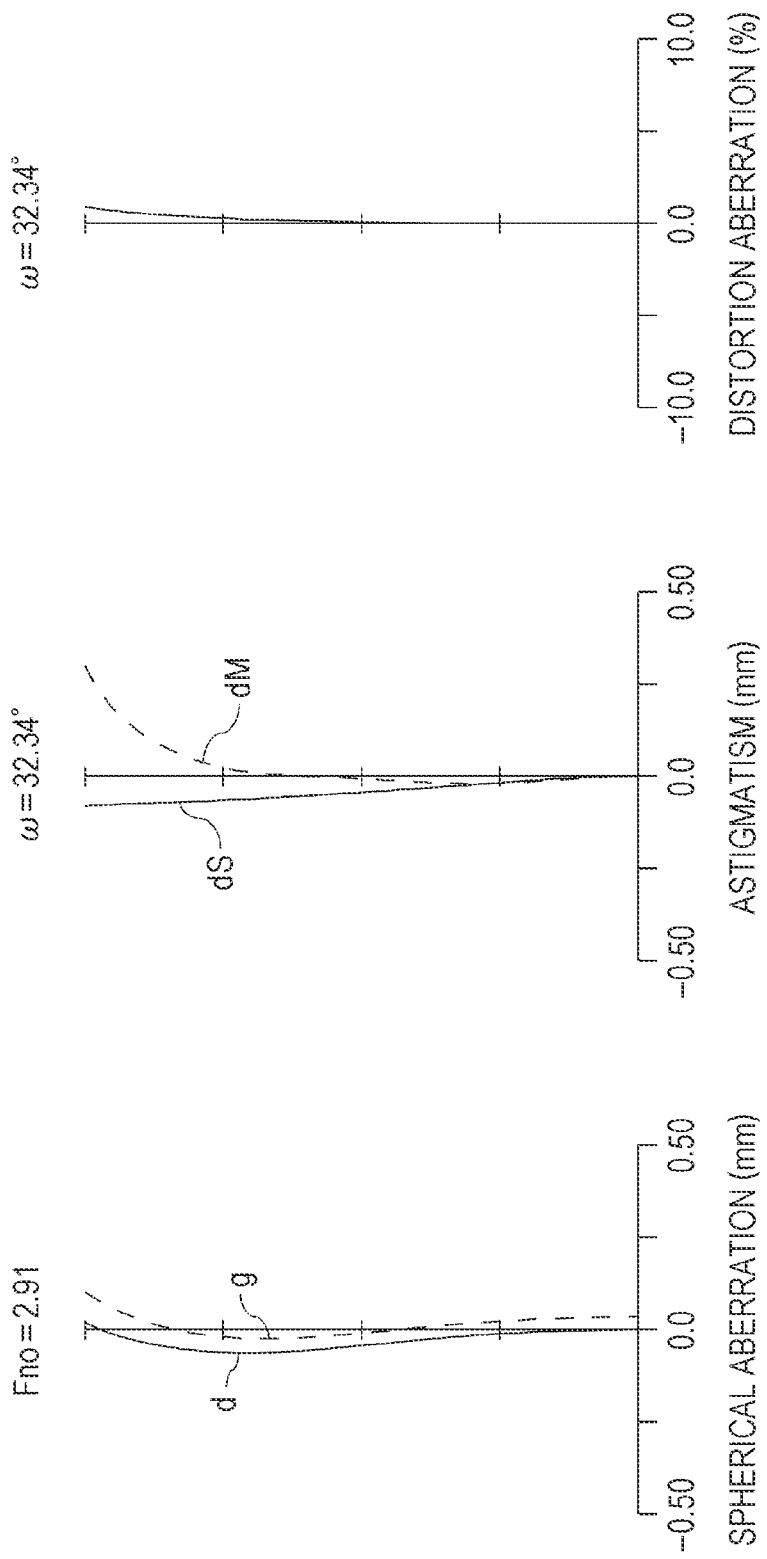
FIG. 11 is an aberration diagram of the zoom lens according to the third embodiment at an intermediate focal length at the time of infinity focus.
Figure 12:
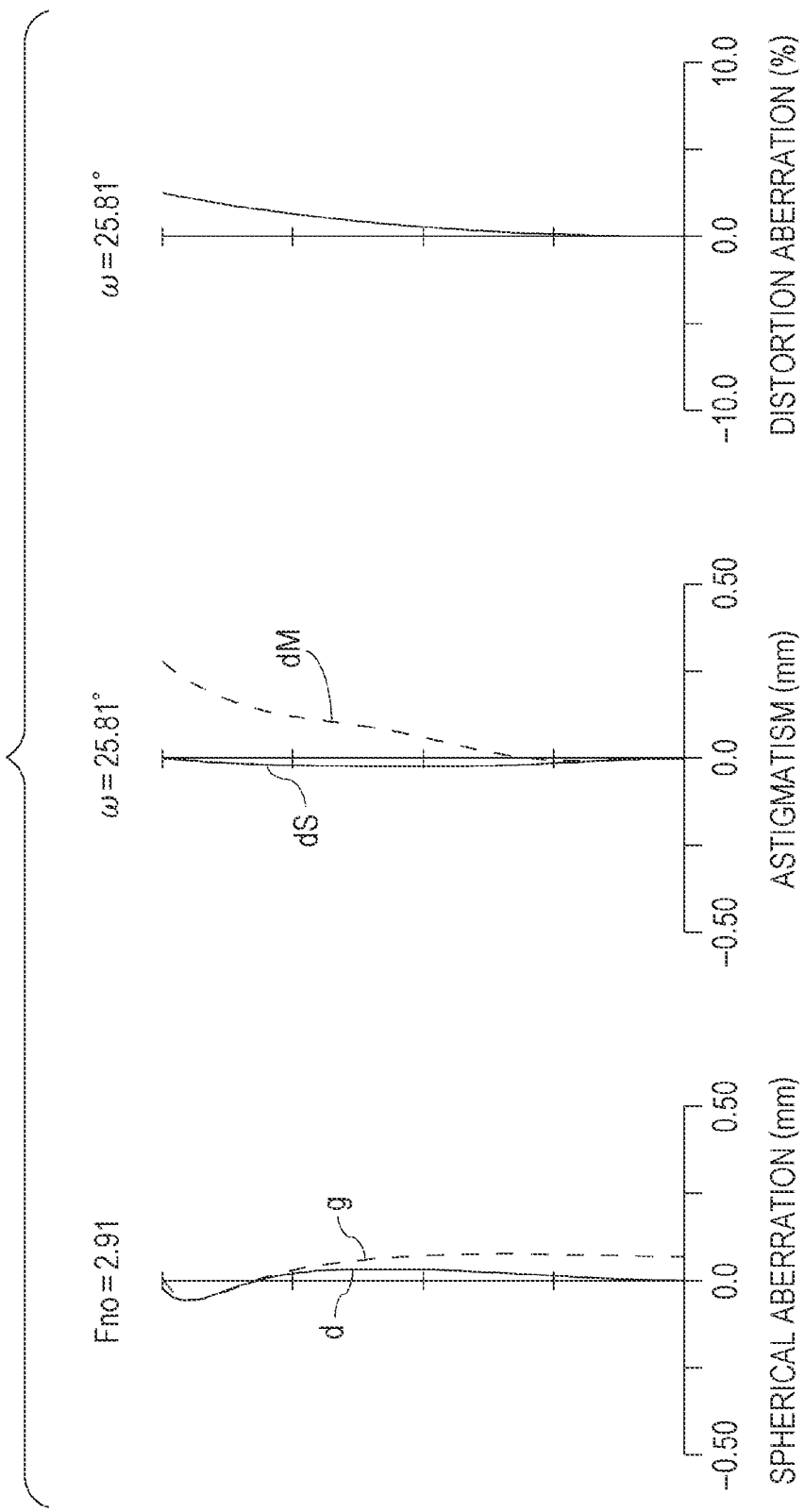
FIG. 12 is an aberration diagram of the zoom lens according to the third embodiment at a telephoto end at the time of infinity focus.

Next, numerical examples to which specific numerical values of the zoom lens are applied will be described. Hereinafter, "surface data", "aspherical data", "magnification data (at the time of infinity focusing)", "magnification data (at the time of finite distance object focusing)", and "focal length data of each lens group" of the zoom lens will be described. FIGS. 10 to 12 illustrate longitudinal aberration diagrams of the zoom lens at the time of infinity focusing at the wide angle end, the intermediate focal length, and the telephoto end.

[Surface data]

| Surface numbers | r | d | nd | vd |
|---|---|---|---|---|
| 1 | 45.952 | 1.500 | 1.72916 | 54.67 |
| 2 | 21.265 | 10.900 | | |
| 3 | 237.042 | 1.200 | 1.49700 | 81.61 |
| 4 | 37.966 | 6.400 | | |
| 5 | 47.328 | 3.100 | 1.80000 | 29.84 |
| 6* | 97.297 | (d6) | | |
| 7S | ∞ | 1.000 | | |
| 8* | 47.289 | 4.400 | 1.61875 | 63.73 |
| 9* | −50.951 | 1.450 | | |
| 10 | −29.943 | 1.000 | 1.51823 | 58.90 |
| 11 | −309.633 | 0.260 | | |
| 12 | 91.408 | 5.400 | 1.49700 | 81.61 |
| 13 | −29.493 | 0.200 | | |
| 14 | 131.839 | 1.000 | 1.65412 | 39.68 |
| 15 | 19.682 | 8.400 | 1.49700 | 81.61 |
| 16 | −29.677 | (d16) | | |
| 17 | 181.727 | 0.800 | 1.51680 | 64.20 |
| 18 | 17.550 | (d18) | | |
| 19 | 30.729 | 7.800 | 1.59282 | 68.62 |
| 20 | −23.631 | 0.200 | | |
| 21 | −38.214 | 1.000 | 1.51680 | 64.20 |
| 22 | 34.923 | 5.260 | | |
| 23* | −45.120 | 1.800 | 1.76802 | 49.24 |
| 24* | −339.370 | (d24) | | |
| 25 | ∞ | 2.500 | 1.51680 | 64.17 |
| 26 | ∞ | 1.000 | | |

[Aspherical surface data]

| Surface numbers | k | A4 | A6 | A8 | A10 | A12 |
|---|---|---|---|---|---|---|
| 6 | 0 | −2.42337E−06 | −4.1374.3E−09 | −1.00930E−11 | 6.08312E−14 | −1.34618E−16 |
| 8 | 0 | −7.53617E−06 | 2.23917E−08 | 2.23406E−11 | 1.62568E−12 | −5.76875E−15 |
| 9 | 0 | 1.48132E−05 | 3.88226E−08 | 1.21260E−10 | 1.24904E−12 | −4.43535E−15 |
| 23 | 0 | −9.92712E−05 | 1.96620E−07 | 3.12240E−10 | −7.57955E−12 | 3.29600E−14 |
| 24 | 0 | −7.60952E−05 | 3.13986E−07 | −6.31332E−10 | 4.37504E−14 | 4.95619E−15 |

-continued

[Surface data]

[Magnification data (at the time of infinity focusing)]

|  | Wide angle | Intermediate | Telephoto |
|---|---|---|---|
| Focal length | 24.722 | 33.903 | 43.649 |
| Fno | 2.91 | 2.91 | 2.91 |
| Image height | 21.633 | 21.633 | 21.633 |
| d6 | 31.322 | 13.540 | 2.429 |
| d16 | 2.907 | 2.640 | 2.600 |
| d18 | 6.044 | 6.312 | 6.352 |
| d24 | 13.000 | 19.158 | 25.322 |

[Magnification data (at the time of finite distance focusing)]

|  | Wide angle | Intermediate | Telephoto |
|---|---|---|---|
| Photographing distance | 300.0 | 300.0 | 300.0 |
| d16 | 4.265 | 4.605 | 5.274 |
| d18 | 4.686 | 4.346 | 3.678 |

[Focal length data of each lens group]

| Group | Range | Focal length |
|---|---|---|
| G1 | 1-6 | −52.309 |
| G2 | 7-16 | 25.718 |
| G3 | 17-18 | −37.652 |
| G4 | 19-24 | 190.665 |
| CG | 25-26 | ∞ |

Fourth Embodiment (1) Optical Configuration of Zoom Lens

Figure 13:
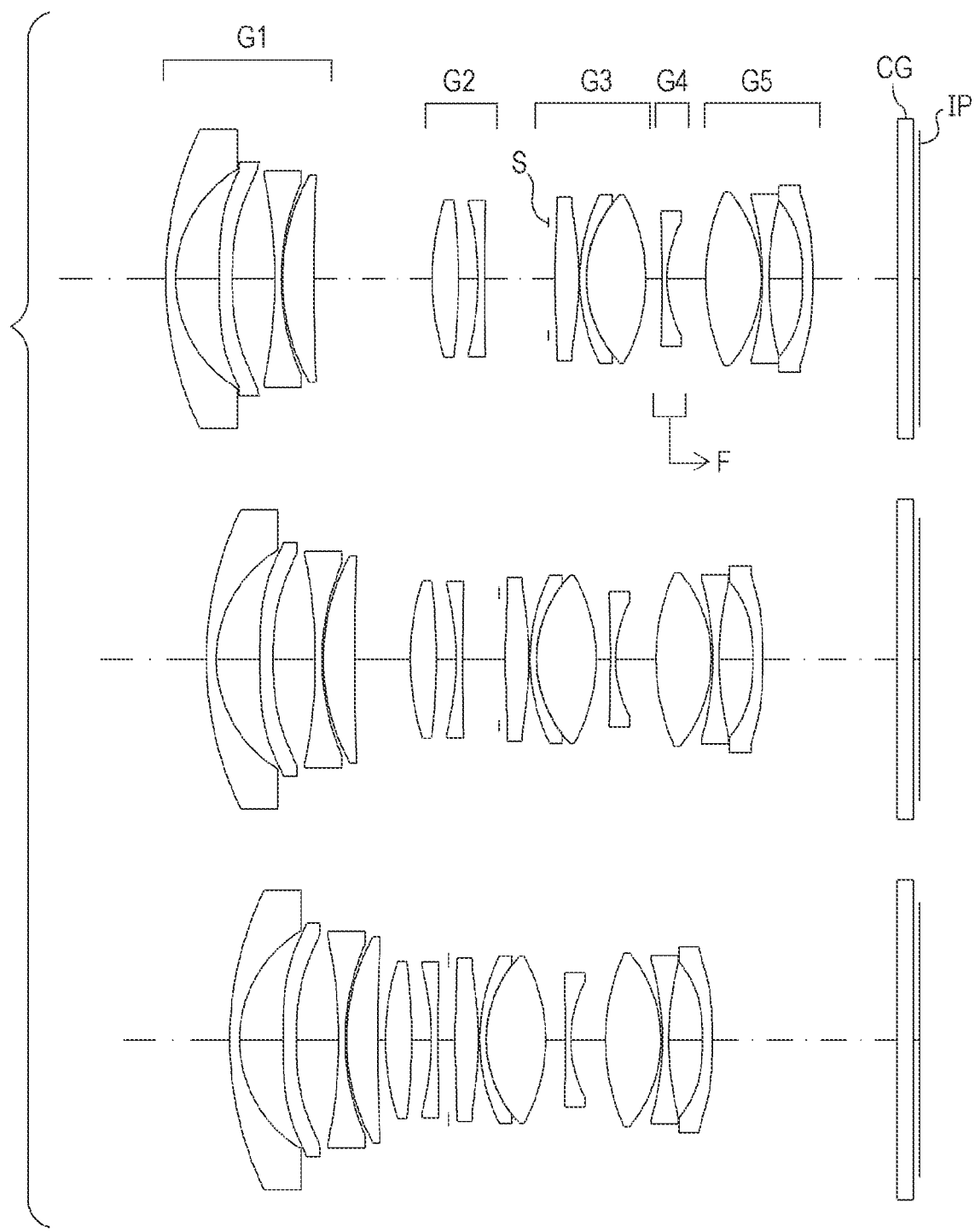
FIG. 13 is a lens cross-sectional view of a zoom lens according to a fourth embodiment at the time of infinity focus.

FIG. 13 is a lens cross-sectional view illustrating the lens configuration of a zoom lens according to a fourth embodiment of the present invention. The zoom lens includes, in order from an object side, a first lens group G1 having negative refractive power, a second lens group G2 having positive refractive power, a third lens group G3 having positive refractive power, a fourth lens group G4 having negative refractive power, and a fifth lens group G5 having positive refractive power, and performs magnification by changing as interval on an optical axis between adjacent lens groups. In the present embodiment, the third lens group G3 is the positive lens group Pa in the present invention, the fourth lens group G4 is the negative lens group N in the present invention, and the fifth lens group G5 is the positive lens group Pb in the present invention.

Hereinafter, the configuration of each lens group will be described. The first lens group G1 includes a negative meniscus lens having a concave shape on the image side, a negative meniscus lens having a concave shape on the image side, a biconcave lens, and a positive meniscus lens having a concave shape on the image side in order from the object side.

The second lens group G2 includes a biconvex lens and a biconcave lens in order from the object side.

The third lens group G3 includes, in order from the object side, an aperture stop S, a biconvex lens, and a cemented lens in which a negative meniscus lens having a concave shape on the image side and the biconvex lens are cemented.

The fourth lens group G4 includes a negative meniscus lens having a concave shape on the image side. That is, the fourth lens group G4 includes one single lens element.

The fifth lens group G5 includes, in order from the object side, a biconvex lens, a biconcave lens, and a negative meniscus lens having a convex shape on the image side.

In the zoom lens according to the fourth embodiment, with respect to the image plane during zooming from the wide end to the telephoto end, the first lens group G1 moves to the image side, the second lens group G2 moves to the object side, the third lens group G3 and the fifth lens group G5 move to the object side with the identical locus, and the fourth lens group G4 moves to the object side. When focusing on a close object from infinity, the fourth lens group G4 moves to the image side.

(2) Numerical Value Examples

Figure 14:
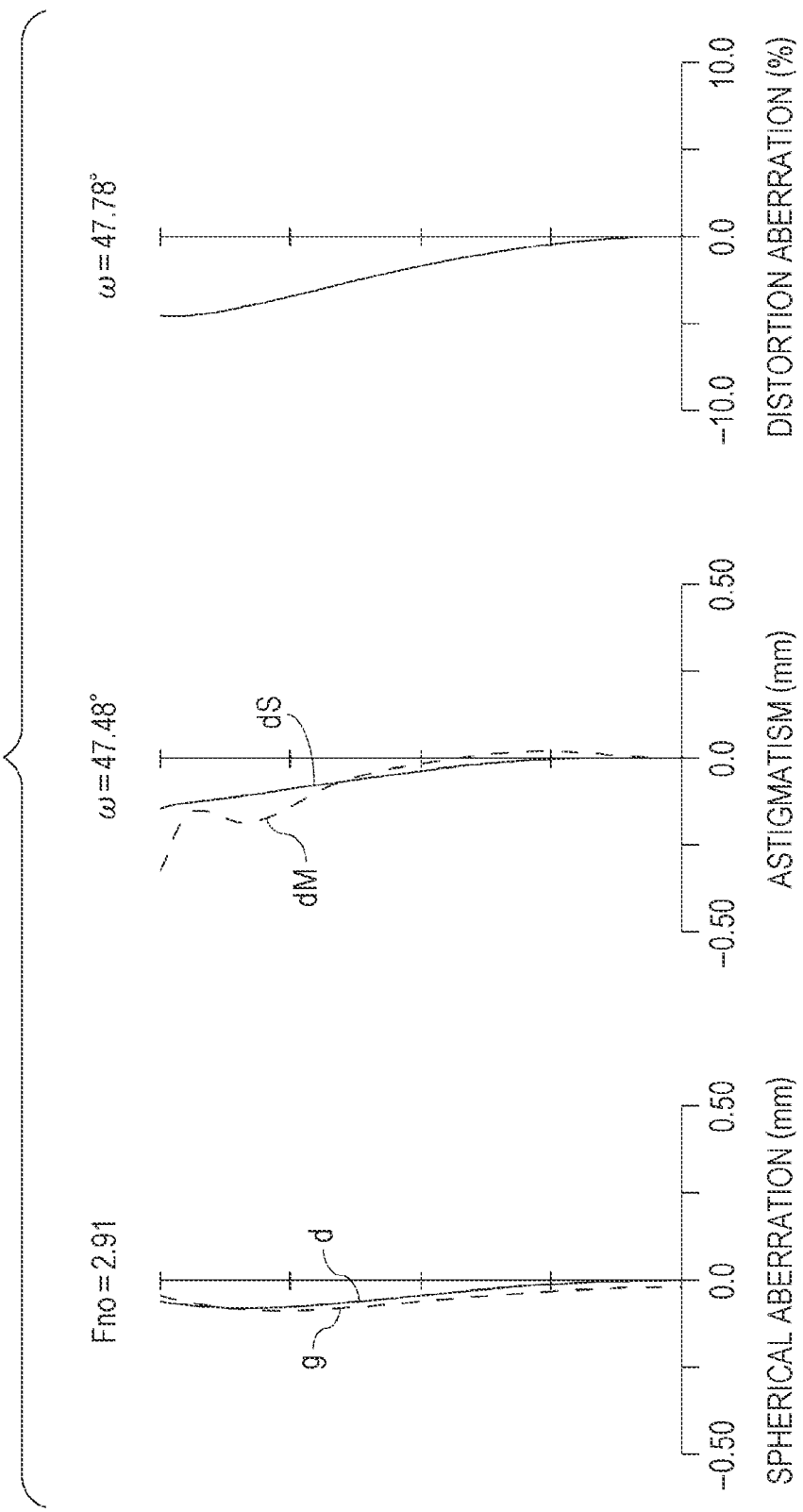
FIG. 14 is an aberration diagram of the zoom lens according to the fourth embodiment at a wide angle end at the time of infinity focus.
Figure 15:
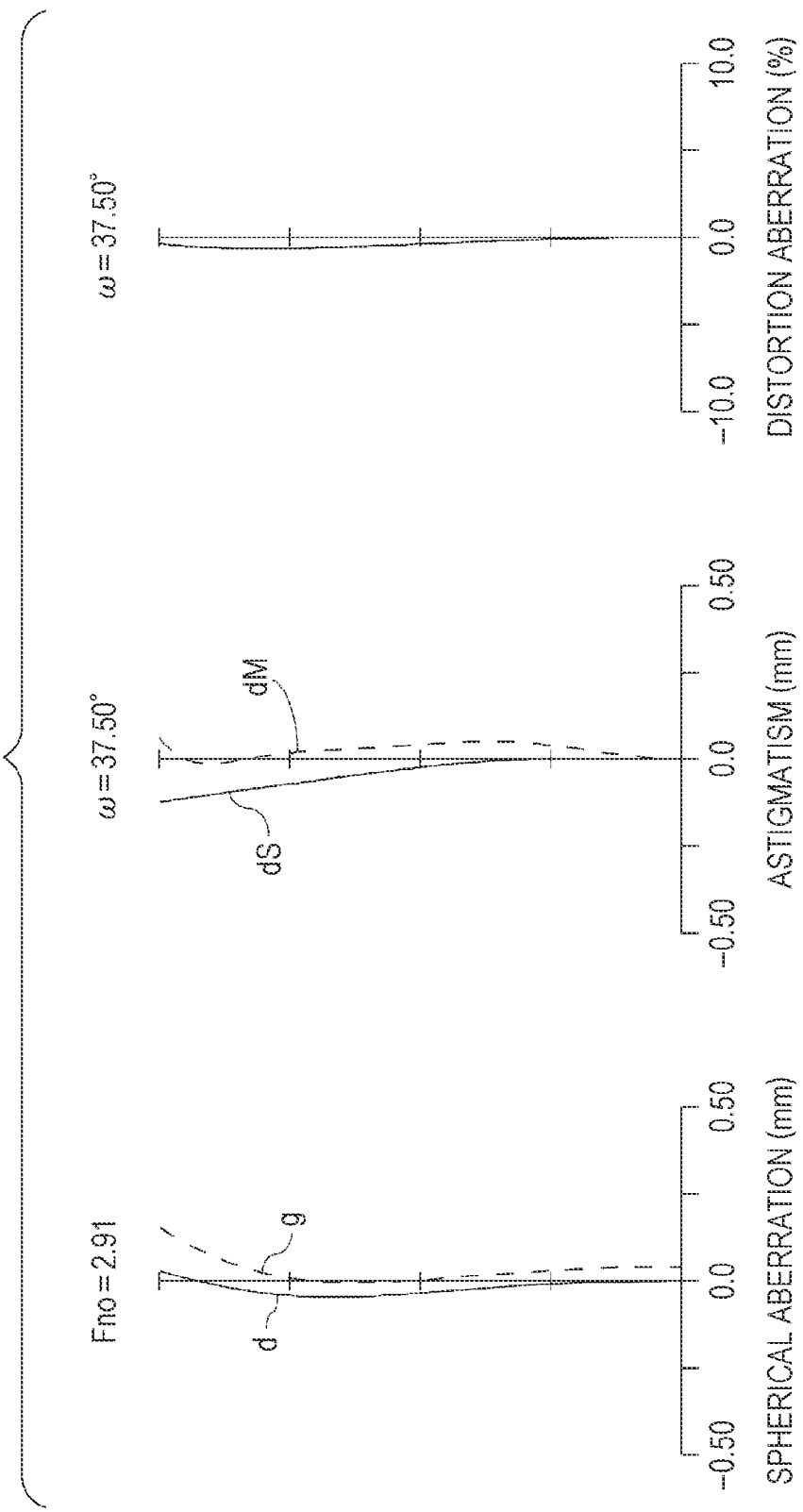
FIG. 15 is an aberration diagram of the zoom lens according to the fourth embodiment at an intermediate focal length at the time of infinity focus.
Figure 16:
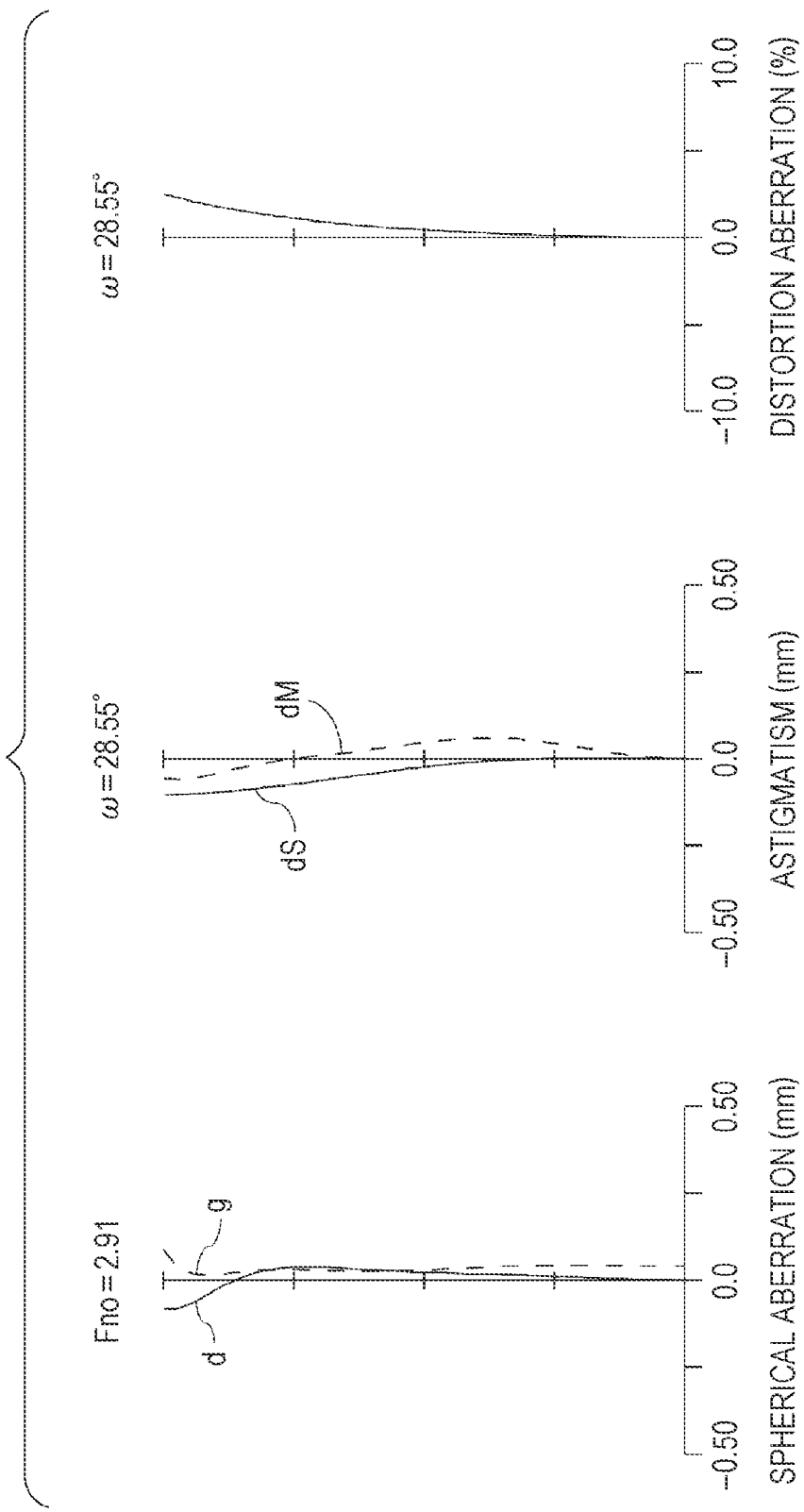
FIG. 16 is an aberration diagram of the zoom lens according to the fourth embodiment at a telephoto end at the time of infinity focus.

Next, numerical examples to which specific numerical values of the zoom lens are applied will be described. Hereinafter, "surface data", "aspherical data", "magnification data (at the time of infinity focusing)", "magnification data (at the time of finite distance object focusing)", and "focal length data of each lens group" of the zoom lens will be described. FIGS. 14 to 16 illustrate longitudinal aberration diagrams of the zoom lens at the time of infinity focusing at the wide angle end, the intermediate focal length, and the telephoto end.

[Surface data]

| Surface numbers | r | d | nd | vd |
|---|---|---|---|---|
| 1 | 52.537 | 1.500 | 1.83481 | 42.72 |
| 2 | 19.564 | 6.700 |  |  |
| 3* | 248.211 | 2.000 | 1.53116 | 56.04 |

-continued

[Surface data]

| | | | | |
|---|---|---|---|---|
| 4* | 69.396 | 6.500 | | |
| 5 | −77.130 | 1.000 | 1.49700 | 81.61 |
| 6 | 36.985 | 0.200 | | |
| 7 | 32.778 | 4.800 | 1.69895 | 30.05 |
| 8 | 354.900 | (d8) | | |
| 9 | 39.796 | 4.000 | 1.80420 | 46.50 |
| 10 | −102.483 | 3.000 | | |
| 11 | −45.840 | 1.000 | 1.80610 | 33.27 |
| 12 | 387.849 | (d12) | | |
| 13S | ∞ | 1.000 | | |
| 14* | 110.503 | 3.600 | 1.49710 | 81.56 |
| 15* | −52.666 | 0.200 | | |
| 16 | 28.820 | 1.000 | 1.80000 | 29.84 |
| 17 | 18.687 | 9.100 | 1.49700 | 81.61 |
| 18 | −26.236 | (d18) | | |
| 19 | −307.118 | 0.800 | 1.51680 | 64.20 |
| 20 | 19.117 | (d20) | | |
| 21 | 32.733 | 8.500 | 1.49700 | 81.61 |
| 22 | −20.706 | 0.200 | | |
| 23 | −44.608 | 1.000 | 1.48749 | 70.44 |
| 24 | 48.669 | 5.150 | | |
| 25* | −50.417 | 1.500 | 1.69350 | 53.20 |
| 26* | −326.071 | (d26) | | |
| 27 | ∞ | 2.500 | 1.51680 | 64.17 |
| 28 | ∞ | 1.000 | | |

[Aspherical surface data]

| Surface numbers | k | A4 | A6 | A8 | A10 | A12 |
|---|---|---|---|---|---|---|
| 3 | 104.338 | 5.87363E−05 | −1.68656E−07 | 3.92096E−10 | −3.88660E−13 | −4.35876E−16 |
| 4 | 13.765 | 5.19123E−05 | −1.79933E−07 | 2.67402E−10 | −4.97263E−14 | −1.78065E−15 |
| 14 | 0 | −2.43348E−05 | 2.46966E−09 | 3.49774E−10 | −5.56209E−14 | 1.72160E−15 |
| 15 | 0 | 4.73268E−06 | 3.11665E−08 | 4.83439E−10 | −8.48951E−13 | 4.25586E−15 |
| 25 | 0 | −1.69820E−04 | 6.54018E−07 | −2.52374E−09 | 1.04924E−11 | −2.16956E−14 |
| 26 | 0 | −1.36399E−04 | 7.60055E−07 | −2.54843E−09 | 7.67085E−12 | −1.15934E−14 |

[Magnification data (at the time of infinity focusing)]

| | Wide angle | Intermediate | Telephoto |
|---|---|---|---|
| Focal length | 20.600 | 28.299 | 38.798 |
| Fno | 2.91 | 2.91 | 2.91 |
| Image height | 21.633 | 21.633 | 21.633 |
| d8 | 18.150 | 8.523 | 1.167 |
| d12 | 9.826 | 5.577 | 1.656 |
| d18 | 2.485 | 2.201 | 3.055 |
| d20 | 5.891 | 6.176 | 5.322 |
| d26 | 13.000 | 20.613 | 28.330 |

[Magnification data (at the time of finite distance focusing)]

| | Wide angle | Intermediate | Telephoto |
|---|---|---|---|
| Photographing distance | 300.0 | 300.0 | 300.0 |
| d18 | 3.410 | 3.535 | 5.11 |
| d20 | 4.966 | 4.842 | 3.265 |

[Focal length data of each lens group]

| Group | Range | Focal length |
|---|---|---|
| G1 | 1-8 | −29.955 |
| G2 | 9-12 | 94.610 |
| G3 | 13-18 | 24.451 |
| G4 | 19-20 | −34.795 |
| G5 | 21-26 | 110.230 |
| CG | 27-28 | ∞ |

Fifth Embodiment (1) Optical Configuration of Zoom Lens

Figure 17:
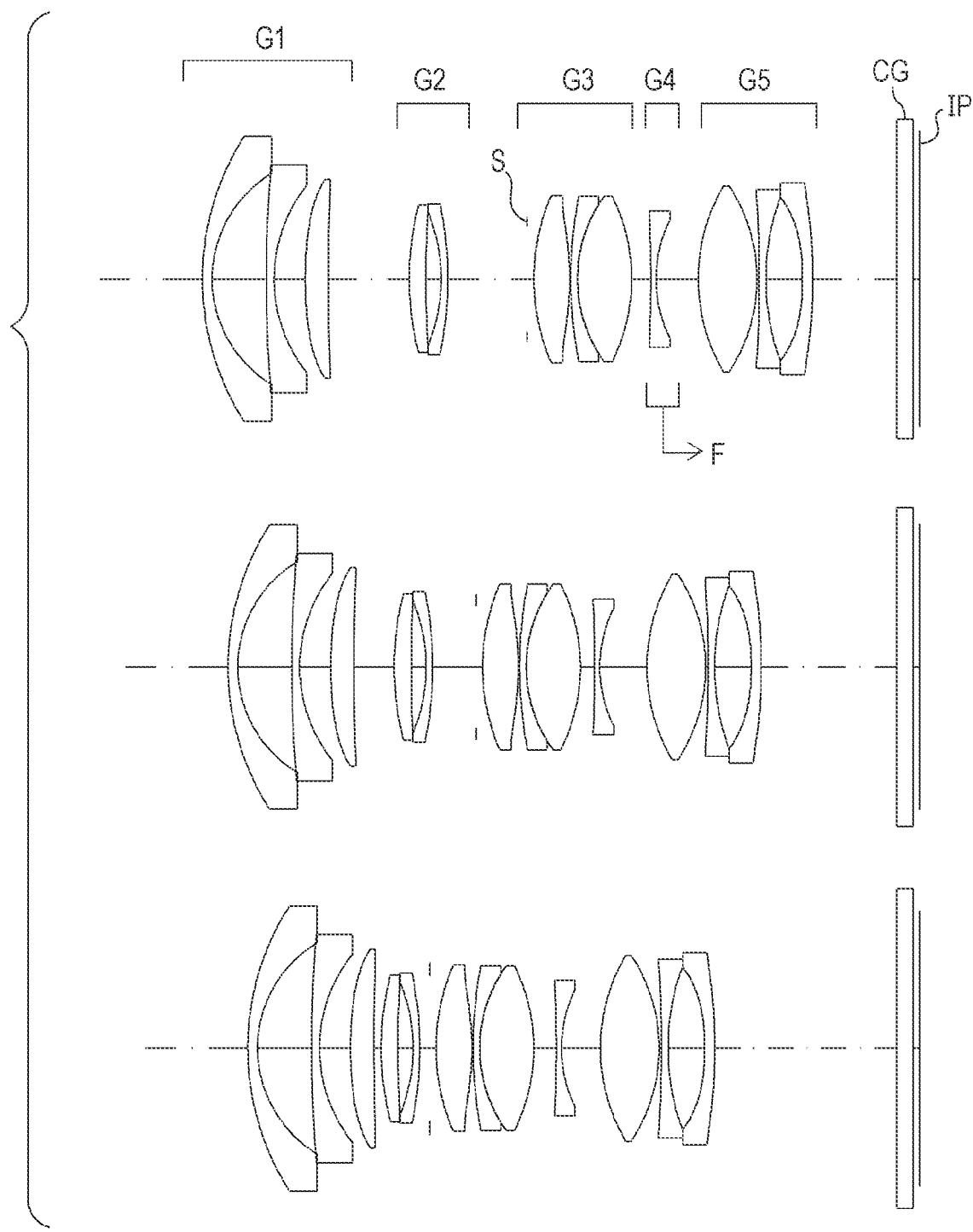
FIG. 17 is a lens cross-sectional view of a zoom lens according to a fifth embodiment at the time of infinity focus.

FIG. 17 is a lens cross-sectional view illustrating the lens configuration of a zoom lens according to a fifth embodiment of the present invention. The zoom lens includes, in order from an object side, a first lens group G1 having negative refractive power, a second lens group G2 having positive refractive power, a third lens group G3 having positive refractive power, a fourth lens group G4 having negative refractive power, and a fifth lens group G5 having positive refractive power, and performs magnification by chancing an interval on an optical axis between adjacent lens groups. In the present embodiment, the third lens group G3 is the positive lens group Pa in the present invention, the fourth lens group G4 is the negative lens group N in the present invention, and the fifth lens group G5 is the positive lens group Pb in the present invention.

Hereinafter, the configuration of each lens group will be described. The first lens group G1 includes a negative meniscus lens having a concave shape on the image side, a negative meniscus lens having a concave shape on the image side, and a positive meniscus lens having a concave shape on the image side in order from the object side.

The second lens group G2 includes a positive meniscus lens having a concave shape on the image side and a negative meniscus lens having a convex shape on the image side in order from the object side.

The third lens group G3 includes, in order from the object side, an aperture stop S, a biconvex lens, and a cemented lens in which a negative meniscus lens having a concave shape on the image side and the biconvex lens are cemented.

The fourth lens group G4 includes a biconcave lens. That is, the fourth lens group G4 includes one single lens element.

The fifth lens group G5 includes, in order from the object side, a biconvex lens, a biconcave lens, and a negative meniscus lens having a convex shape on the image side.

In the zoom lens according to the fifth embodiment, with respect to the image plane during zooming from the wide end to the telephoto end, the first lens group G1 moves to the image side, the second lens group G2 moves to the object side, the third lens group G3 and the fifth lens group G5 move to the object side with the identical locus, and the fourth lens group G4 moves to the object side. When focusing on a close object from infinity, the fourth lens group G4 moves to the image side.

(2) Numerical Value Examples

Figure 18:
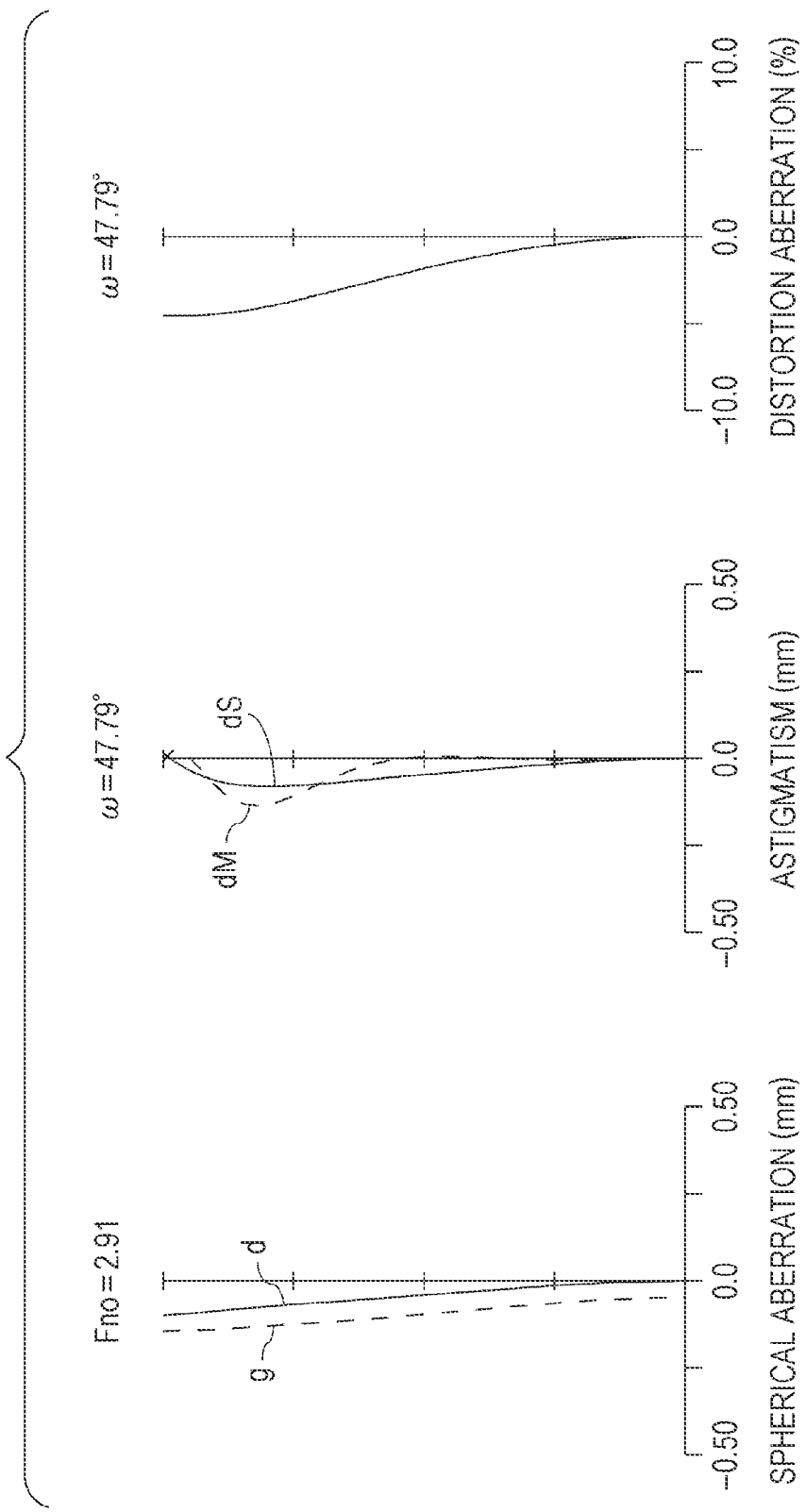
FIG. 18 is an aberration diagram of the zoom lens according to the fifth embodiment at a wide angle end at the time of infinity focus.
Figure 19:
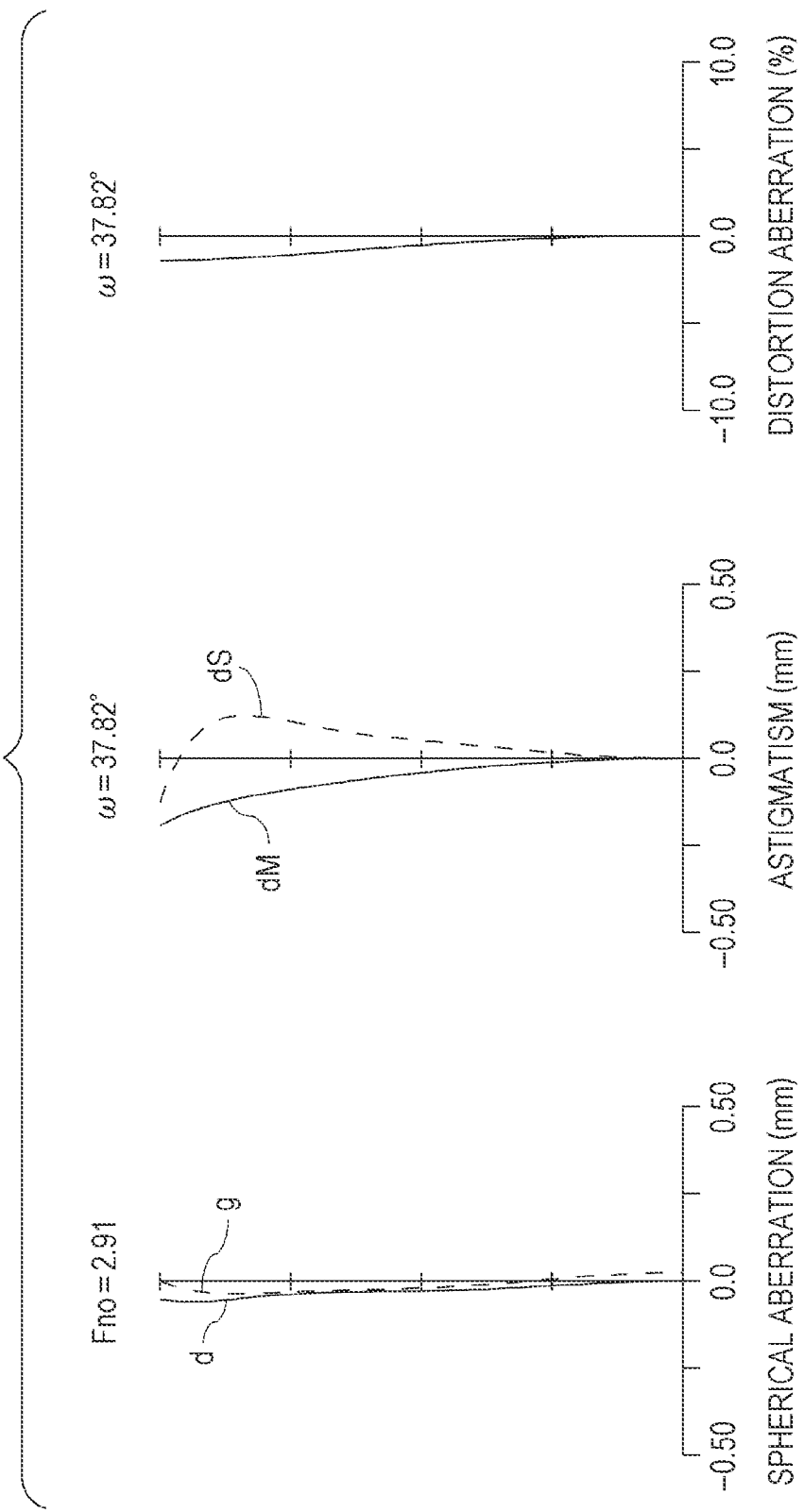
FIG. 19 is an aberration diagram of the zoom lens according to the fifth embodiment at an intermediate focal length at the time of infinity focus.
Figure 20:
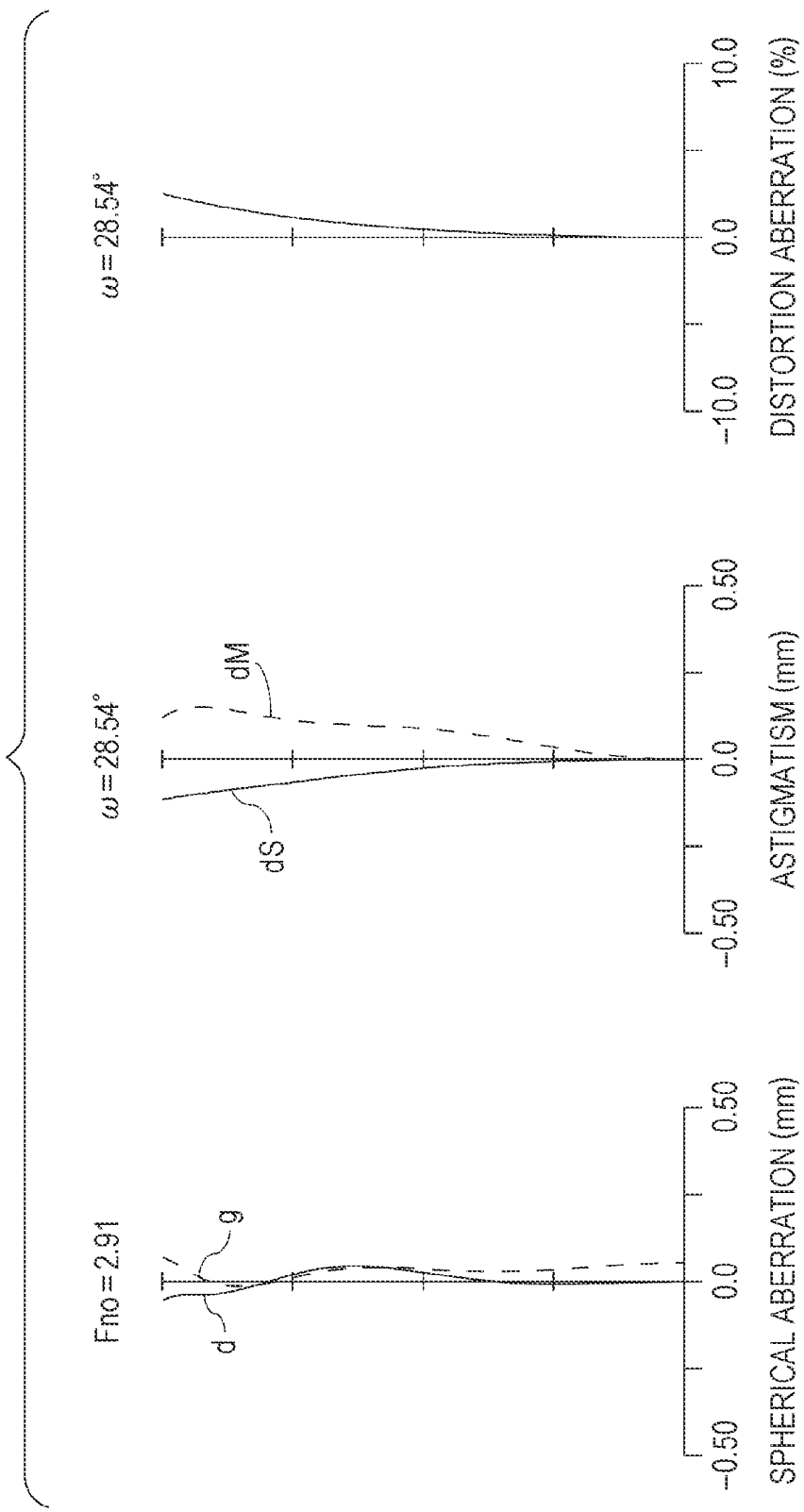
FIG. 20 is an aberration diagram of the zoom lens according to the fifth embodiment at a telephoto end at the time of infinity focus.

Next, numerical examples to which specific numerical values of the zoom lens are applied will be described. Hereinafter, "surface data", "aspherical data", "magnification data (at the time of infinity focusing)", "magnification data (at the time of finite distance object focusing)", and "focal length data of each lens group" of the zoom lens will be described. FIGS. 18 to 20 illustrate longitudinal aberration diagrams of the zoom lens at the time of infinity focusing at the wide angle end, the intermediate focal length, and the telephoto end.

[Surface data]

| Surface numbers | r | d | nd | vd |
|---|---|---|---|---|
| 1 | 40.431 | 1.500 | 1.72916 | 54.67 |
| 2 | 18.851 | 8.300 | | |
| 3 | 206.724 | 1.200 | 1.49700 | 81.61 |
| 4 | 23.053 | 4.750 | | |
| 5* | 63.842 | 3.600 | 1.58144 | 40.75 |
| 6 | 473.989 | (d6) | | |
| 7 | 44.365 | 2.600 | 1.85025 | 30.05 |
| 8 | 205.807 | 2.300 | | |
| 9 | −26.627 | 1.000 | 1.65160 | 58.55 |
| 10 | −57.608 | (d10) | | |
| 11S | ∞ | 1.000 | | |
| 12* | 30.005 | 5.500 | 1.49710 | 81.56 |
| 13* | −42.901 | 0.200 | | |
| 14 | 67.771 | 1.000 | 1.69895 | 30.05 |
| 15 | 21.567 | 8.300 | 1.49700 | 81.61 |
| 16 | −28.302 | (d16) | | |
| 17 | −225.290 | 0.800 | 1.48749 | 70.44 |
| 18 | 20.336 | (d18) | | |
| 19 | 28.053 | 9.000 | 1.49700 | 81.61 |
| 20 | −25.778 | 0.360 | | |
| 21 | −199.876 | 1.000 | 1.48749 | 70.44 |
| 22 | 36.384 | 5.600 | | |
| 23* | −46.528 | 1.500 | 1.69350 | 53.20 |
| 24* | −322.828 | (d24) | | |
| 25 | ∞ | 2.500 | 1.51680 | 64.17 |
| 26 | ∞ | 1.000 | | |

[Aspherical surface data]

| Surface numbers | k | A4 | A6 | A8 | A10 | A12 |
|---|---|---|---|---|---|---|
| 5 | 0 | 1.50123E−05 | 1.01378E−08 | 1.54171E−10 | −5.82881E−13 | 1.29706E−15 |
| 12 | 0 | −1.35562E−05 | 1.42835E−08 | 2.01889E−10 | −8.41463E−13 | 5.67008E−15 |
| 13 | 0 | 2.03313E−05 | 2.56042E−08 | 7.97875E−12 | 6.50224E−13 | 2.72603E−15 |
| 23 | 0 | −1.04390E−04 | 3.52369E−07 | 8.34182E−12 | −5.65180E−12 | 4.03488E−15 |
| 24 | 0 | −7.41185E−05 | 4.30076E−07 | −4.27344E−10 | −3.46987E−12 | 8.46178E−15 |

[Magnification data (at the time of infinity focusing)]

| | Wide angle | Intermediate | Telephoto |
|---|---|---|---|
| Focal length | 20.603 | 28.305 | 38.803 |
| Fno | 2.91 | 2.91 | 2.91 |
| Image height | 21.633 | 21.633 | 21.633 |

-continued

[Surface data]

| | | | |
|---|---|---|---|
| d6 | 12.353 | 6.131 | 1.113 |
| d10 | 12.197 | 6.641 | 1.500 |
| d16 | 2.959 | 2.195 | 3.438 |
| d18 | 6.456 | 7.219 | 5.977 |
| d24 | 13.001 | 20.882 | 27.959 |

[Magnification data (at the time of finite distance focusing)]

| | Wide angle | Intermediate | Telephoto |
|---|---|---|---|
| Photographing distance | 300.0 | 300.0 | 300.0 |
| d16 | 4.050 | 3.814 | 6.063 |
| d18 | 5.365 | 5.600 | 3.351 |

[Focal length data of each lens group]

| Group | Range | Focal length |
|---|---|---|
| G1 | 1-6 | −31.546 |
| G2 | 7-10 | 350.820 |
| G3 | 11-16 | 23.939 |
| G4 | 17-18 | −38.221 |
| G5 | 19-24 | 84.521 |
| CG | 25-26 | ∞ |

Sixth Embodiment (1) Optical Configuration of Zoom Lens

Figure 21:
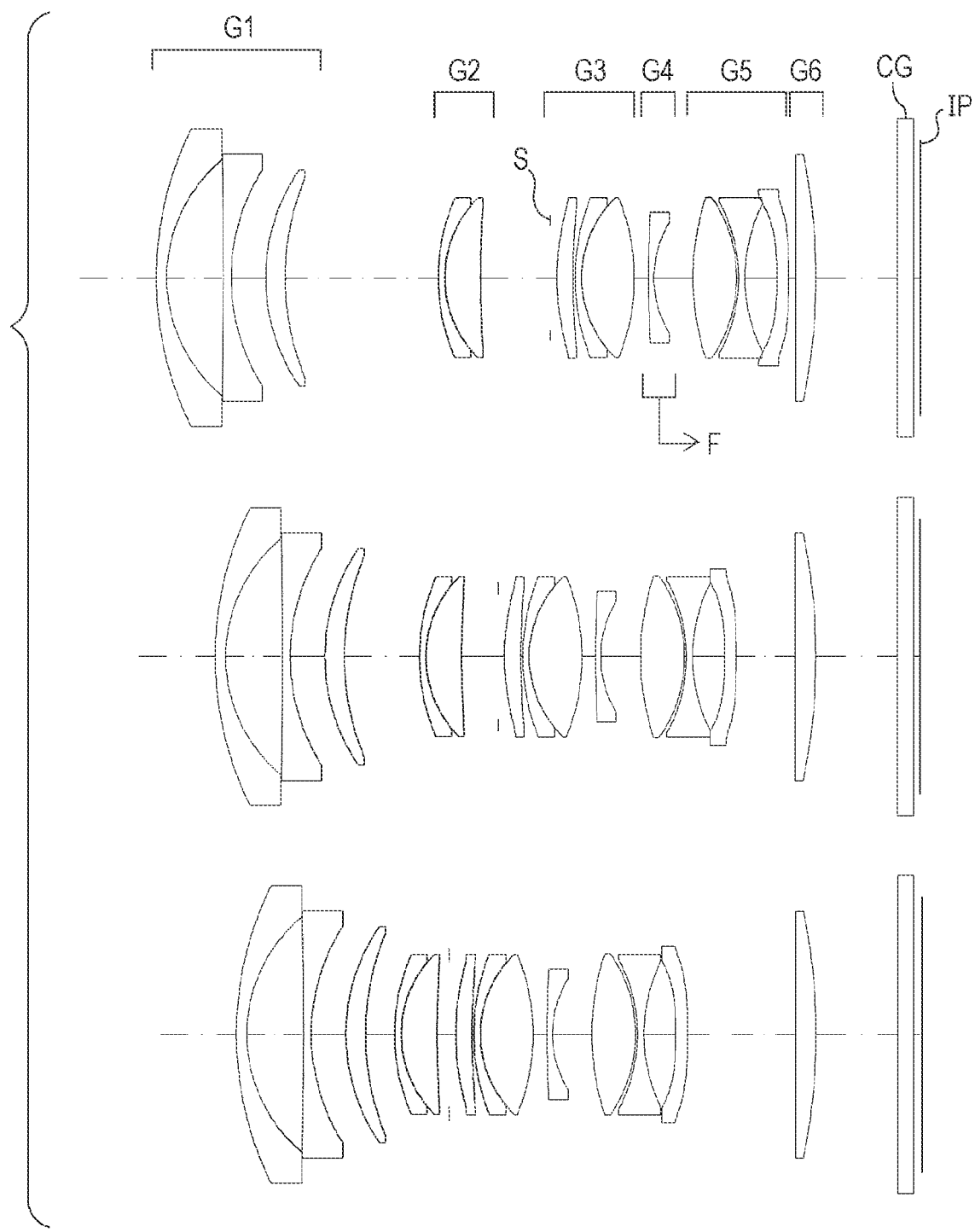
FIG. 21 is a lens cross-sectional view of a zoom lens according to a sixth embodiment at the time of infinity focus.

FIG. 21 is a lens cross-sectional view illustrating the lens configuration of a zoom lens according to a sixth embodiment of the present invention. The zoom lens includes, in order from an object side, a first lens group G1 having negative refractive power, a second lens group G2 having positive refractive power, a third lens group G3 having positive refractive power, a fourth lens group G4 having negative refractive power, a fifth lens group G5 having positive refractive power, and a sixth lens group G6 having positive refractive power, and performs magnification by changing an interval on an optical axis between adjacent lens groups. In the present embodiment, the third lens group G3 is the positive lens group Pa in the present invention, the fourth lens group G4 is the negative lens group N in the present invention, and the fifth lens group G5 is the positive lens group Pb in the present invention.

Hereinafter, the configuration of each lens group will be described. The first lens group G1 includes a negative meniscus lens having a concave shape on the image side, a biconcave lens, and a positive meniscus lens having a concave shape on the image side in order from the object side.

The second lens group G2 includes the negative meniscus lens having a concave shape on the image side and the positive meniscus lens having a convex shape on the image side in order from the object side.

The third lens group G3 includes, in order from the object side, an aperture stop S, a biconvex lens, and a cemented lens in which a negative meniscus lens having a concave shape on the image side and the biconvex lens are cemented.

The fourth lens group G4 includes a negative meniscus lens having a concave shape on the image side. That is, the fourth lens group G4 includes one single lens element.

The fifth lens group G5 includes, in order from the object side, a biconvex lens, a biconcave lens, and a negative meniscus lens having a convex shape on the image side.

The sixth lens group G6 includes a biconvex lens.

In the zoom lens according to the sixth embodiment, with respect to the image plane during zooming from the wide end to the telephoto end, the first lens group G1 moves to the image side, the second lens group G2 moves to the object side, the third lens group G3 and the fifth lens group G5 move to the object side with the identical locus, the fourth lens group G4 moves to the object side, and the sixth lens group is fixed with respect to the image plane. When focusing on a close object from infinity, the fourth lens group G4 moves to the image side.

(2) Numerical Value Examples

Figure 22:
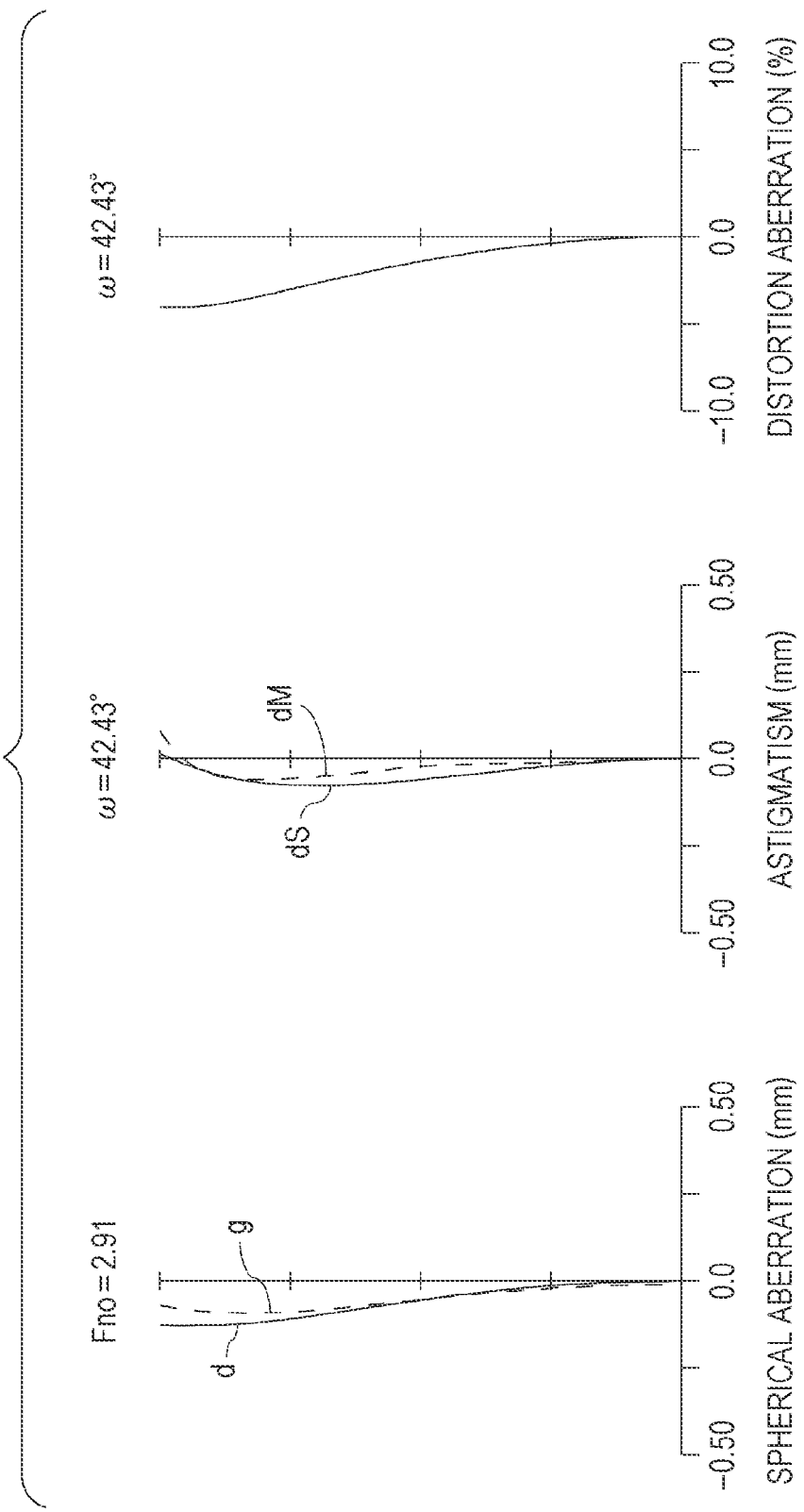
FIG. 22 is an aberration diagram of the zoom lens according to the sixth embodiment at a wide angle end at the time of infinity focus.
Figure 23:
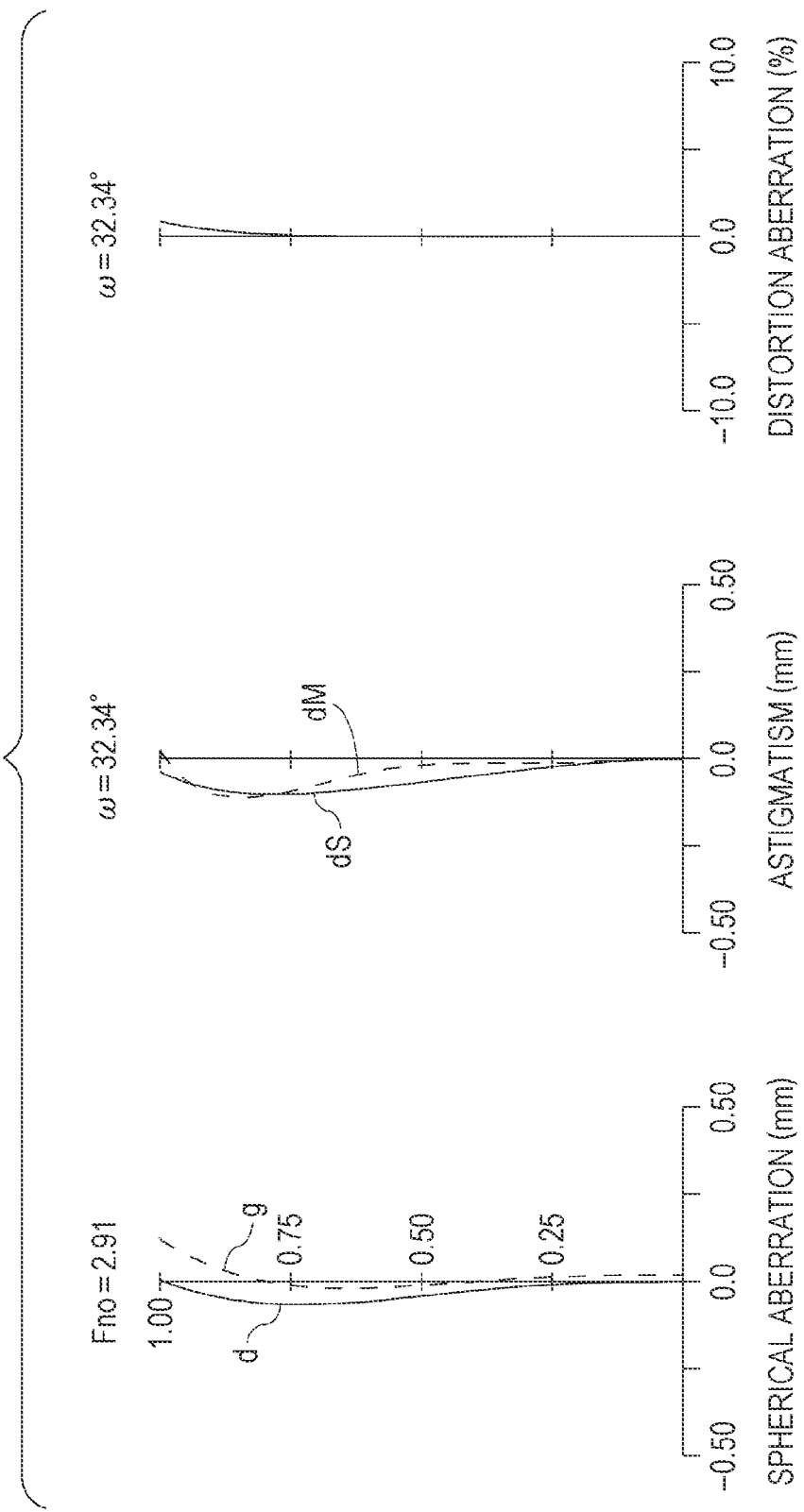
FIG. 23 is an aberration diagram of the zoom lens according to the sixth embodiment at an intermediate focal length at the time of infinity focus.
Figure 24:
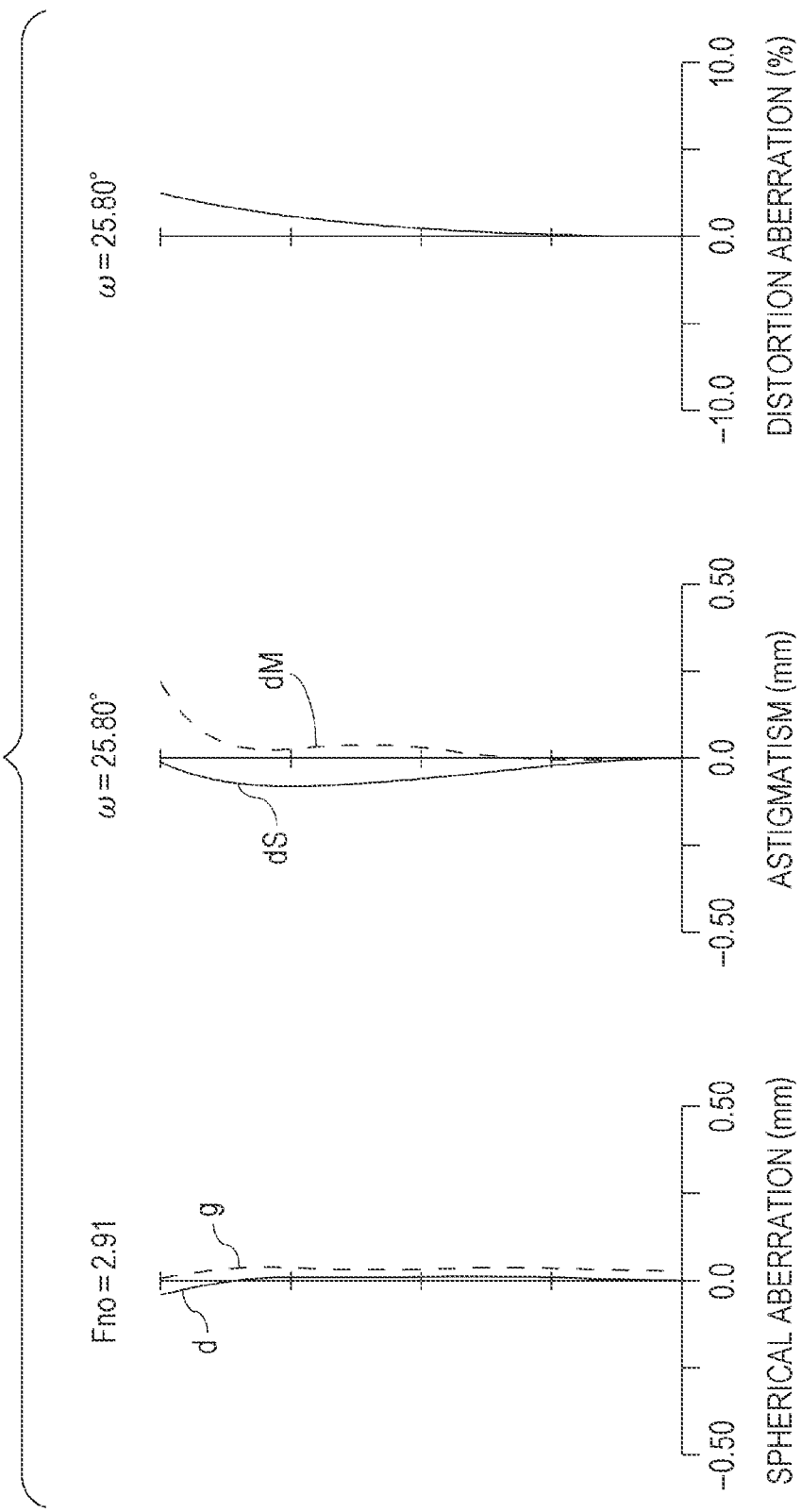
FIG. 24 is an aberration diagram of the zoom lens according to the sixth embodiment at a telephoto end at the time of infinity focus.

Next, numerical examples to which specific numerical values of the zoom lens are applied will be described. Hereinafter, "surface data", "aspherical data", "magnification data (at the time of infinity focusing)", "magnification data (at the time of finite distance object focusing)", and "focal length data of each lens group" of the zoom lens will be described. FIGS. 22 to 24 illustrate longitudinal aberration diagrams of the zoom lens at the time of infinity focusing at the wide angle end, the intermediate focal length, and the telephoto end.

[Surface data]

| Surface numbers | r | d | nd | vd |
|---|---|---|---|---|
| 1 | 51.558 | 1.600 | 1.69680 | 55.46 |
| 2 | 23.562 | 8.700 | | |
| 3 | −824.263 | 1.200 | 1.49700 | 81.61 |
| 4 | 31.222 | 5.300 | | |

-continued

[Surface data]

| | | | | |
|---|---|---|---|---|
| 5 | 29.335 | 3.000 | 1.84666 | 23.78 |
| 6 | 40.544 | (d6) | | |
| 7 | 30.587 | 1.000 | 1.83481 | 42.72 |
| 8 | 17.282 | 5.500 | 1.61997 | 63.88 |
| 9 | 180.487 | (d9) | | |
| 10S | ∞ | 1.000 | | |
| 11* | 36.477 | 2.550 | 1.59349 | 67.00 |
| 12* | 188.340 | 0.260 | | |
| 13 | 33.044 | 1.000 | 1.60342 | 38.03 |
| 14 | 17.124 | 8.100 | 1.49700 | 81.61 |
| 15 | −32.265 | (d15) | | |
| 16 | 189.357 | 0.800 | 1.56883 | 56.04 |
| 17 | 16.386 | (d17) | | |
| 18 | 40.517 | 6.7 00 | 1.75500 | 52.32 |
| 19 | −21.706 | 0.280 | | |
| 20 | −24.479 | 1.000 | 1.54072 | 47.23 |
| 21 | 25.518 | 4.900 | | |
| 22* | −73.790 | 1.800 | 1.80604 | 40.74 |
| 23* | −219.998 | (d23) | | |
| 24 | 26891.800 | 3.200 | 1.72916 | 54.67 |
| 25 | −92.223 | 12.500 | | |
| 26 | ∞ | 2.500 | 1.51680 | 64.17 |
| 27 | ∞ | 1.000 | | |

[Aspherical surface data]

| Surface numbers | k | A4 | A6 | A8 | A10 | A12 |
|---|---|---|---|---|---|---|
| 11 | 0 | −3.95079E−06 | −2.56387E−08 | −2.83126E−10 | −6.21002E−14 | −2.18663E−15 |
| 12 | 0 | 1.57750E−05 | −1.78106E−08 | −1.54441E−10 | −9.95994E−13 | 9.02354E−16 |
| 22 | 0 | −8.68425E−05 | 2.00621E−08 | 2.83431E−10 | −7.06240E−12 | 6.08187E−14 |
| 23 | 0 | −7.10563E−05 | 1.10831E−07 | −3.10811E−10 | 1.52486E−12 | 6.68018E−15 |

[Magnification data (at the time of infinity focusing)]

| | Wide angle | Intermediate | Telephoto |
|---|---|---|---|
| Focal length | 24.719 | 33.901 | 43.650 |
| Fno | 2.91 | 2.91 | 2.91 |
| Image height | 21.633 | 21.633 | 21.633 |
| d6 | 23.476 | 11.524 | 4.479 |
| d9 | 10.685 | 5.546 | 1.845 |
| d15 | 2.206 | 2.063 | 2.156 |
| d17 | 6.022 | 6.164 | 6.072 |
| d23 | 1.000 | 9.013 | 16.557 |

[Magnification data (at the time of finite distance focusing)]

| | Wide angle | Intermediate | Telephoto |
|---|---|---|---|
| Photographing distance | 300.0 | 300.0 | 300.0 |
| d15 | 3.417 | 3.773 | 4.452 |
| d17 | 4.811 | 4.454 | 3.776 |

[Focal length data of each lens group]

| Group | Range | Focal length |
|---|---|---|
| G1 | 1-6 | −42.010 |
| G2 | 7-9 | 84.473 |
| G3 | 10-15 | 26.610 |
| G4 | 16-17 | −31.5891 |
| G5 | 18-23 | 175.536 |
| G6 | 24-25 | 126.052 |
| CG | 26-27 | ∞ |

[Conditional expression corresponding value]

| | First embodiment | Second embodiment | Third embodiment | Fourth embodiment | Fifth embodiment | Sixth embodiment |
|---|---|---|---|---|---|---|
| (1) (Rnf + Rnri/(Rnf − Rnr) | 1.26 | 1.21 | 1.21 | 0.88 | 0.83 | 1.19 |
| (2) fn/ft | −0.64 | −0.67 | −0.86 | −0.90 | −0.99 | −0.72 |
| (3) (1 − βnt2) × βrt2 | −4.53 | −3.67 | −3.43 | −3.54 | −2.76 | −4.03 |
| (4) vdn | 58.16 | 55.46 | 64.20 | 64.20 | 70.44 | 56.04 |
| (5) XF/XR | −0.68 | −1.19 | −1.34 | −0.64 | −0.47 | −0.79 |
| (6) Ymax/BFw | 1.38 | 1.38 | 1.38 | 1.38 | 1.38 | 1.43 |
| (7) βprt/βprw | 0.91 | 0.65 | 0.91 | 0.79 | 0.68 | 0.88 |

According to the present invention, it is possible to provide a wide angle or standard zoom lens that has a large aperture, a small size, and a high optical performance, and an image device.

What is claimed is:

1. A zoom lens, comprising:
a first lens group having negative refractive power on a most object side; and
a positive lens group Pa having positive refractive power, a negative lens group N having negative refractive power, and a positive lens group Pb having positive refractive power that are arranged in this order from an object side and provided on an image side with respect to the first lens group, wherein
during zooming from a wide angle end to a telephoto end, the first lens group moves to an image side, the positive lens group Pa and the positive lens group Pb move to an object side along an identical locus, and magnification is varied by changing an interval on an optical axis between adjacent lens groups,
the negative lens group N is moved to an image side to focus on an object at a finite distance from infinity,
following conditions are satisfied:

$$0.80 < (Rnf+Rnr)/(Rnf-Rnr) < 1.40 \quad (1)$$

$$-1.20 < fn/ft < -0.50 \quad (2)$$

where
Rnf is a curvature radius of a surface of a most object side in the negative lens group N,
Rnr is a curvature radius of a surface of a most image side in the negative lens group N,
fn is a focal length of the negative lens group N, and
ft is a focal length of the zoom lens at a telephoto end,
a following condition is satisfied:

$$-5.40 < (1-\beta nt^2) \times \beta rt^2 < -2.40 \quad (3)$$

where
βnt is a lateral magnification at a telephoto end of the negative lens group N, and
βrt is a composite lateral magnification at a telephoto end of all lens groups located on an image side relative to the negative lens group N, and
a following condition is satisfied:

$$0.70 < Ymax/BFw < 1.60 \quad (6)$$

where
Ymax is a maximum image height of the zoom lens, and
BFw is back focus at a wide angle end of the zoom lens at a time of infinity focus.

2. The zoom lens according to claim 1, further comprising a stop between the first lens group and the positive lens group Pa.

3. The zoom lens according to claim 1, wherein the negative lens group N consists of one lens element, and a following condition is satisfied:

$$vdn > 50 \quad (4)$$

where
vdn is an Abbe number of a lens element constituting the negative lens group N.

4. The zoom lens according to claim 1, wherein a following condition is satisfied:

$$-1.60 \leq XF/XR \leq -0.30 \quad (5)$$

where
XF is a movement distance on an optical axis of the first lens group during zooming from a wide angle end to a telephoto end, and
XR is a movement distance on an optical axis the positive lens group Pa during zooming from a wide angle end to a telephoto end.

5. A zoom lens, comprising:
a first lens group having negative refractive power on a most object side; and
a positive lens group Pa having positive refractive power, a negative lens group N having negative refractive power, and a positive lens group Pb having positive refractive power that are arranged in this order from an object side and provided on an image side with respect to the first lens group, wherein
during zooming from a wide angle end to a telephoto end, the first lens group moves to an image side, the positive lens group Pa and the positive lens group Pb move to an object side along an identical locus, and magnification is varied by changing an interval on an optical axis between adjacent lens groups,
the negative lens group N is moved to an image side to focus on an object at a finite distance from infinity,
following conditions are satisfied:

$$0.80 < (Rnf+Rnr)/(Rnf-Rnr) < 1.40 \quad (1)$$

$$-1.20 < fn/ft < -0.50 \quad (2)$$

where
Rnf is a curvature radius of a surface of a most object side in the negative lens group N,
Rnr is a curvature radius of a surface of a most image side in the negative lens group N,
fn is a focal length of the negative lens group N, and
ft is a focal length of the zoom lens at a telephoto end, and
the positive lens group Pb has at least one lens surface having an aspherical shape, and a following condition is satisfied:

$$0.50 < \beta rt/\beta prw < 1.70 \quad (7)$$

where
- βprw is a lateral magnification of the positive lens group Pb at a wide angle end, and
- βprt is a lateral magnification of the positive lens group Pb at a telephoto end.

6. An image device comprising:

the zoom lens according to claim 1; and an image sensor that converts an optical image formed on an image side of the zoom lens by the zoom lens into an electrical signal.

7. An image device comprising:

the zoom lens according to claim 5; and an image sensor that converts an optical image formed on an image side of the zoom lens by the zoom lens into an electrical signal.

* * * * *